United States Patent
Ochiai et al.

(10) Patent No.: US 7,133,093 B2
(45) Date of Patent: Nov. 7, 2006

(54) LIQUID CRYSTAL DISPLAY DEVICE HAVING PARTICULAR NUMBER OF THE LIGHT EMITTING ELEMENTS IN THE BACKLIGHT FOR THE COLOR DISPLAY

(75) Inventors: Takahiro Ochiai, Chiba (JP); Kazuhiko Yanagawa, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 154 days.

(21) Appl. No.: 10/933,251

(22) Filed: Sep. 3, 2004

(65) Prior Publication Data

US 2005/0052590 A1    Mar. 10, 2005

(30) Foreign Application Priority Data

Sep. 4, 2003    (JP) ............................. 2003-312693

(51) Int. Cl.
  *G02F 1/1335* (2006.01)
  *G02F 1/136* (2006.01)
  *G02F 1/1343* (2006.01)

(52) U.S. Cl. ............................. 349/70; 349/61; 349/43; 349/38; 349/68

(58) Field of Classification Search ................. 349/70, 349/71, 61
See application file for complete search history.

(56) References Cited

U.S. PATENT DOCUMENTS 5,402,143 A * 3/1995 Ge et al. .................... 345/102
6,100,861 A * 8/2000 Cohen et al. .................. 345/88
6,160,596 A * 12/2000 Sylvester et al. ............. 349/61
6,657,605 B1 * 12/2003 Boldt et al. .................... 345/83
6,781,648 B1 * 8/2004 Takahashi et al. ............ 349/68
6,791,636 B1 * 9/2004 Paolini et al. ................. 349/61
6,980,176 B1 * 12/2005 Matsumoto et al. ........... 345/6
7,002,546 B1 * 2/2006 Stuppi et al. ............... 345/102
2004/0227869 A1 * 11/2004 Martynov et al. ............. 349/61

FOREIGN PATENT DOCUMENTS

JP    2001-66569    3/2001

* cited by examiner

*Primary Examiner*—Andrew Schechter
*Assistant Examiner*—Mike Qi
(74) *Attorney, Agent, or Firm*—Antonelli, Terry, Stout and Kraus, LLP.

(57) ABSTRACT

A liquid crystal display device includes a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements. The liquid crystal display device further includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color.

24 Claims, 26 Drawing Sheets

FIG. 24A  FIG. 24B  FIG. 24C
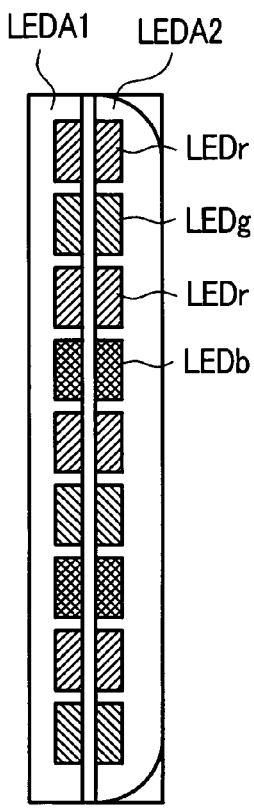
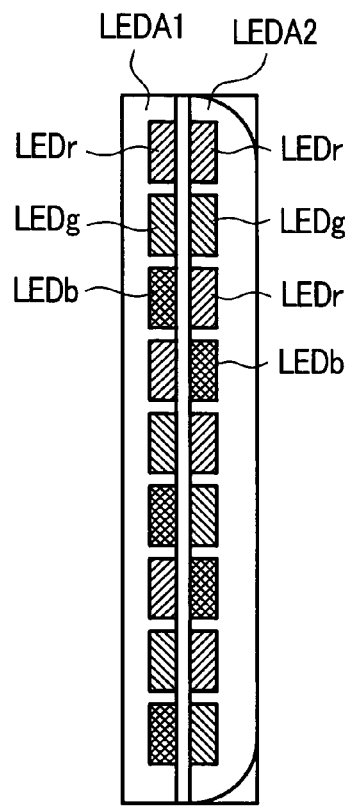
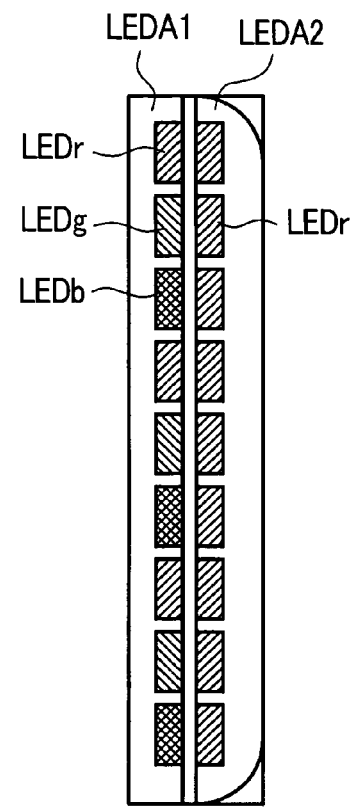
FIG. 25
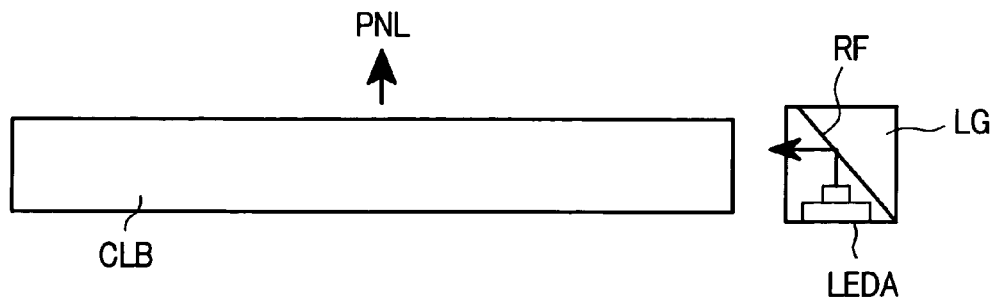

LIQUID CRYSTAL DISPLAY DEVICE HAVING PARTICULAR NUMBER OF THE LIGHT EMITTING ELEMENTS IN THE BACKLIGHT FOR THE COLOR DISPLAY

BACKGROUND OF THE INVENTION

1. Field of the Invention

The invention relates to a liquid crystal display device, and more particularly to a liquid crystal display device which is constituted of at least a liquid crystal display panel for color display and a backlight.

2. Description of the Related Art

A liquid crystal display panel is configured such that liquid crystal is provided between respective substrates which are arranged to face each other in an opposed manner and a large number of pixels are arranged in the spreading direction of the liquid crystal.

Here, each pixel includes means to independently generate an electric field at a portion thereof and the optical transmissivity of the liquid crystal in the pixel is controlled based on the electric field.

Accordingly, usually, a backlight is arranged on a back surface of the liquid crystal display panel and a viewer can observe light from the backlight through the respective pixels.

Here, with respect to the liquid crystal display panel for color display, respective red, green and blue filters are incorporated into three respective pixels which are arranged close to each other (a unit pixel for color display) and an image display of a given color can be recognized due to mixing of lights having respective colors through the respective filters.

Further, in Japanese Unexamined Patent Publication 2001-66569, there has been known a liquid crystal display device in which, as a backlight, a light source is constituted of respective red, green and blue light emitting diodes which are respectively provided in the same plural number and the liquid crystal display device uses a white light obtained by mixing these lights of three colors.

SUMMARY OF THE INVENTION

However, with respect to the liquid crystal display device having such a constitution, as described above, as the backlight, it is necessary to prepare the respective red, green and blue diodes in the same plural number respectively to irradiate the white light and the change of ratio of numbers of light emitting diodes of respective colors has not been taken into consideration.

This is because that when the ratio of numbers of light emitting diodes of respective colors is changed, the white light is not obtained and the lights which pass through the respective filters of the pixels exhibit colors different from the desired colors.

Accordingly, in forming the backlight, the degree of freedom in manufacturing the backlight is limited and there has been a strong demand for the measure to overcome such a drawback.

The present invention has been made under such circumstances and it is one of advantages of the invention to provide a liquid crystal display device which can enhance the degree of freedom in manufacturing a backlight and the like.

To briefly explain the summary of the representative inventions among inventions disclosed in this specification, they are as follows.

(1) The liquid crystal display device according to the invention, for example, is constituted of a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color.

(2) The liquid crystal display device according to the invention, for example, is constituted of a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the largest numerical aperture out of the respective pixels allocated to red, green and blue, and the number of light emitting elements of color corresponding to color which is allocated to the pixels having the largest numerical aperture is smaller than the number of light emitting elements of other color.

(3) The liquid crystal display device according to the invention, for example, is constituted of a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the smallest light transmitting quantity out of the respective pixels allocated to red, green and blue, and the number of light emitting elements of color corresponding to color which is allocated to the pixels having the smallest light transmitting quantity is larger than the number of light emitting elements of other color.

(4) The liquid crystal display device according to the invention, for example, is constituted of a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the smallest numerical aperture out of the respective pixels allocated to red, green and blue, and the number of light emitting elements of color corresponding to color which is allocated to the pixels having the smallest numerical aperture is larger than the number of light emitting elements of other color.

(5) The liquid crystal display device according to the invention, for example, is constituted of a liquid crystal display panel having respective pixels which are allocated to red, green and blue and a light source which allows light to pass through the respective pixels, wherein each pixel includes a thin film transistor which is driven in response to a signal from a gate signal line and a pixel electrode to which a signal from a drain signal line is supplied through the thin film transistor, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a channel width of the thin film transistors provided to the pixels having the largest light transmitting quantity out of the respective pixels allocated to red, green and blue is set larger than a channel width of the thin film transistors provided to other pixels.

(6) The liquid crystal display device according to the invention, for example, is constituted of a liquid crystal display panel having respective pixels which are allocated to red, green and blue and a light source which allows light to pass through the respective pixels, wherein each pixel includes a thin film transistor which is driven in response to a signal from a gate signal line and a pixel electrode to which a signal from a drain signal line is supplied through the thin film transistor, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a channel width of the thin film transistors provided to the pixels having the largest light transmitting quantity out of the respective pixels allocated to red, green and blue is set larger than a channel width of the thin film transistors provided to other pixels, and a width of a drain signal line which is connected to the thin film transistors provided to the pixels having the largest light transmitting quantity out of the respective pixels allocated to red, green and blue is set wider than a width of a drain signal line which is connected to the thin film transistors provided to other pixels.

(7) The liquid crystal display device according to the invention, for example, is constituted of a liquid crystal display panel having respective pixels which are allocated to red, green and blue and a light source which allows light to pass through the respective pixels, wherein each pixel includes a thin film transistor which is driven in response to a signal from a gate signal line and a pixel electrode to which a signal from a drain signal line is supplied through the thin film transistor, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a spaced-apart distance between the pixel electrode of the pixel having the largest light transmitting quantity out of the respective pixels allocated to red, green and blue and the gate signal line which drives the thin film transistor of the pixel is set larger than a spaced-apart distance between the pixel electrode of other pixel and the gate signal line which drives the thin film transistor of other pixel.

(8) The liquid crystal display device according to the invention, for example, is constituted of a liquid crystal display panel having respective pixels which are allocated to red, green and blue and a light source which allows light to pass through the respective pixels, wherein each pixel includes a thin film transistor which is driven in response to a signal from a gate signal line, a pixel electrode to which a signal from a drain signal line is supplied through the thin film transistor and a capacitance element which is formed between a connection portion of the thin film transistor with the pixel electrode and a storage signal line, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a capacitance value of the capacitance elements provided to the pixels having the largest light transmitting quantity out of the respective pixels allocated to red, green and blue is set smaller than a capacitance value of the capacitance elements provided to other pixels.

(9) The liquid crystal display device according to the invention is, on the premise of any one of the above-mentioned constitutions (1) to (8), characterized in that the light source is constituted of light emitting elements of respective colors which are arranged on a side surface of at least one side of a light guide plate arranged on a back surface of the liquid crystal display panel in parallel along the longitudinal direction of the side surface.

(10) The liquid crystal display device according to the invention is, on the premise of any one of the above-mentioned constitutions (1) to (8), characterized in that with respect to the respective pixels allocated to red, green and blue, the pixels allocated to one color have the largest light transmitting quantity or numerical aperture, the pixels allocated to another color have the smallest light transmitting quantity or numerical aperture, and the pixels allocated to still another color have an intermediate light transmitting quantity or numerical aperture.

Here, the invention is not limited to the above-mentioned constitution and various modifications are conceivable without departing from the technical concept of the invention.

According to the liquid crystal display device having such a constitution, basically, by changing the light transmitting qualities or the numerical apertures of the pixels of the unit pixel for color display which are allocated to respective colors, the number of light emitting elements of respective colors of the light source is determined.

Here, although the lights emitted from the respective light emitting elements which constitute the light source do not produce a white light, the lights which pass through the respective pixels reach a viewer as red, green and blue lights corresponding to the light transmitting quantity of liquid crystal.

Further, although the pixels which decrease the light transmitting quantity or the numerical aperture are present in the unit pixel for color display, the number of light emitting elements of color corresponding to such pixels is increased and hence, the intensity of light is increased thus obviating the occurrence of drawbacks from this point of view.

Accordingly, due to the above-mentioned constitution, to the contrary, when it is necessary to arbitrarily set the number of light emitting elements of respective colors used as the light source, it is sufficient to change the light transmitting quantities or the numerical apertures of the pixels allocated to respective colors and hence, the degree of freedom of the backlight or the like can be increased.

BRIEF DESCRIPTION OF THE DRAWINGS

FIG. 1A and FIG. 1B are explanatory views showing one embodiment of a unit pixel for color display of a liquid crystal display device according to the invention, wherein FIG. 1A is a plan view and FIG. 1B is an equivalent circuit diagram;

FIG. 24A, FIG. 24B and FIG. 24C are views showing an example of arrangement of respective light emitting diodes in the backlight shown in FIG. 23;

FIG. 25 is a constitutional view showing another embodiment of the backlight of the liquid crystal display device according to the invention;

DESCRIPTION OF THE PREFERRED EMBODIMENTS

Preferred embodiments of liquid crystal display devices according to the invention are explained in detail in conjunction with drawings.

Figure 2:
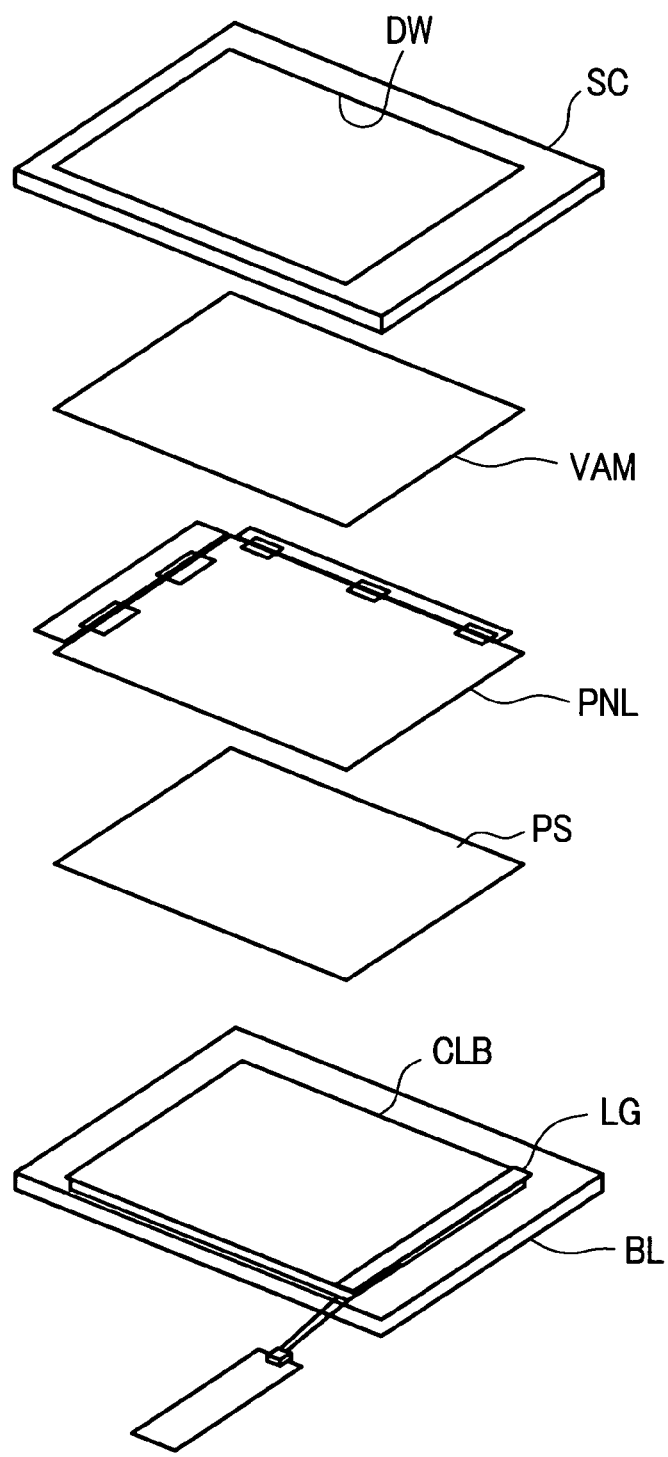
FIG. 2 is an exploded perspective view showing one embodiment of the constitution of a module of the liquid crystal display device according to the invention.

FIG. 2 is an exploded perspective view of the liquid crystal display device according to the invention which is formed into a module.

As shown in FIG. 2, the liquid crystal display device is constituted by integrally stacking a shielding case SC, a viewing angle magnification film VAM, a liquid crystal display panel PNL, a prism sheet PS and a backlight BL.

Here, the shielding case SC is a frame body which forms a display window DW on a portion thereof which faces a display part of the liquid crystal display panel PNL. By fixing a periphery of the shielding case SC to the backlight BL, the viewing angle magnification film VAM, the liquid crystal display panel PNL and the prism sheet PS can be incorporated in a space defined by the shielding case SC and the backlight BL.

Further, the backlight BL includes at least a light guide plate CLB which is arranged to face the display part of the liquid crystal display panel PNL and a light source LG which is arranged along at least one side of the light guide plate CLB, wherein light emitted from the light source LG enters into the inside of the light guide plate CLB through a side surface of the light guide plate CLB and, thereafter, is irradiated to a surface side of the light guide plate CLB which faces the liquid crystal display panel PNL in an opposed manner.

Here, the light source LG is constituted of a plurality of red (R) light emitting diodes LEDr, a plurality of green (G) light emitting diodes LEDg and a plurality of blue (B) light emitting diodes LEDb which are arranged in a mixed form.

Figure 3:
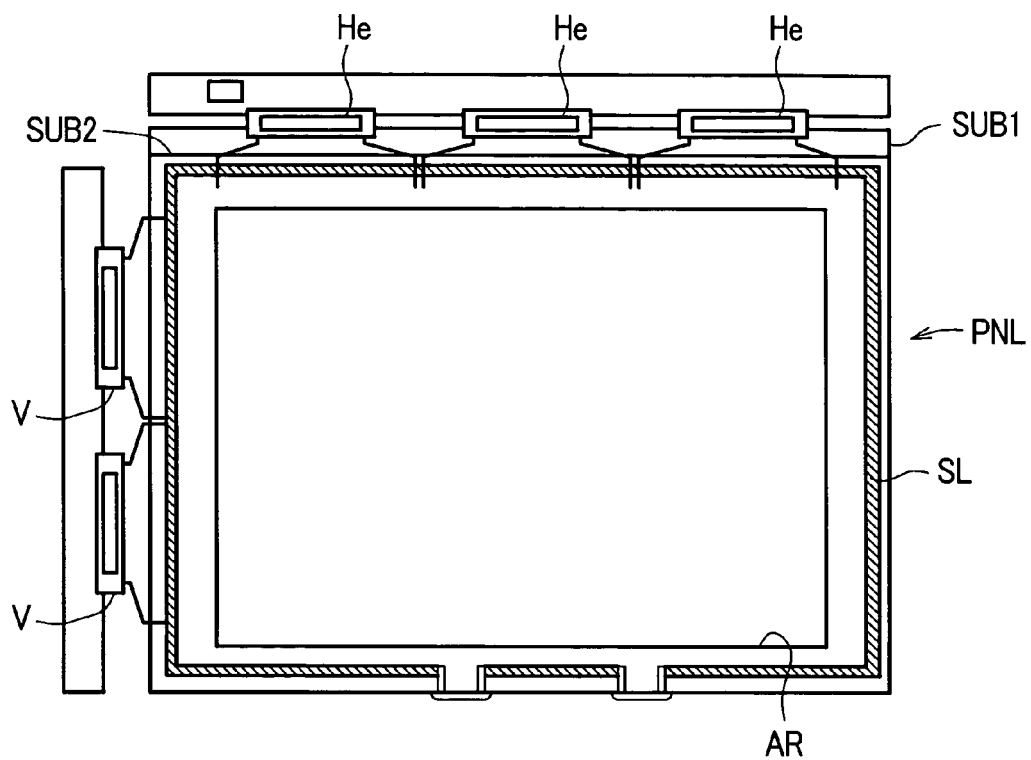
FIG. 3 is a plan view showing one embodiment of the constitution of a liquid crystal display panel incorporated into the liquid crystal display device according to the invention.

FIG. 3 is a plan view showing the detail of the liquid crystal display panel PNL. The liquid crystal display panel PNL is constituted of a panel which is formed of respective substrates (for example, glass substrates) which are arranged to face each other with liquid crystal therebetween and liquid crystal drive circuits which are mounted on a periphery of the panel.

The respective substrates SUB1, SUB2 which form the panel are fixed to each other by a sealing material SL which is formed around the liquid crystal and the display part AR is constituted in the inside of a region surrounded by the sealing material SL.

Here, a plurality of gate signal lines GL and a plurality of drain signal lines DL are formed on the display part AR, wherein one ends of the respective gate signal lines GL are connected to a scanning signal drive circuit V which constitutes one of the above-mentioned liquid crystal drive circuits and one ends of the respective drain signal lines DL are connected to video signal drive circuits He which constitute one of the above-mentioned liquid crystal drive circuits.

Figure 4:
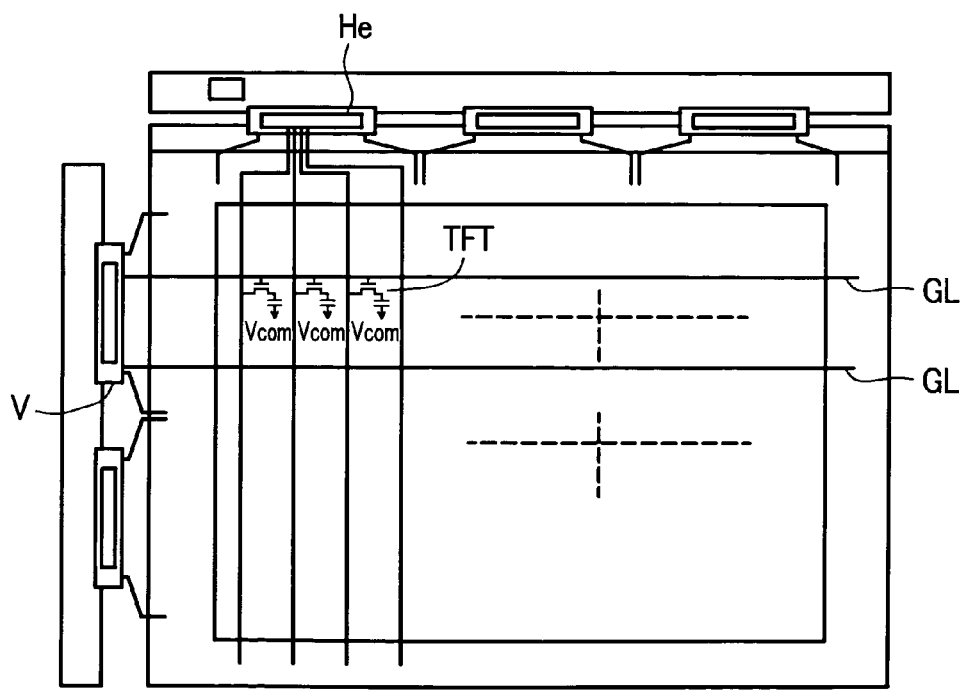
FIG. 4 is a plan view showing one embodiment of the constitution of the pixel of the liquid crystal display panel.

FIG. 4 is a view which corresponds to FIG. 3 and shows the constitution of respective pixels on the display part AR. Each pixel is configured such that the pixel includes a region which is surrounded by the gate signal lines GL which extend in the x direction and are arranged in parallel in the y direction in the drawing and the drain signal lines DL which extend in the y direction and are arranged in parallel in the x direction in the drawing, and on each region, a thin film transistor TFT which is turned on with the supply of a scanning signal from one gate signal line GL, a pixel electrode to which a video signal is supplied from the drain signal line DL through the thin film transistor TFT and a counter electrode which is arranged to face the pixel electrode with the liquid crystal therebetween.

Here, a signal (Vcom) which becomes the reference with respect to the video signal is supplied to the counter electrode, wherein the counter electrode is provided in common with the respective pixels.

Figure 1A:
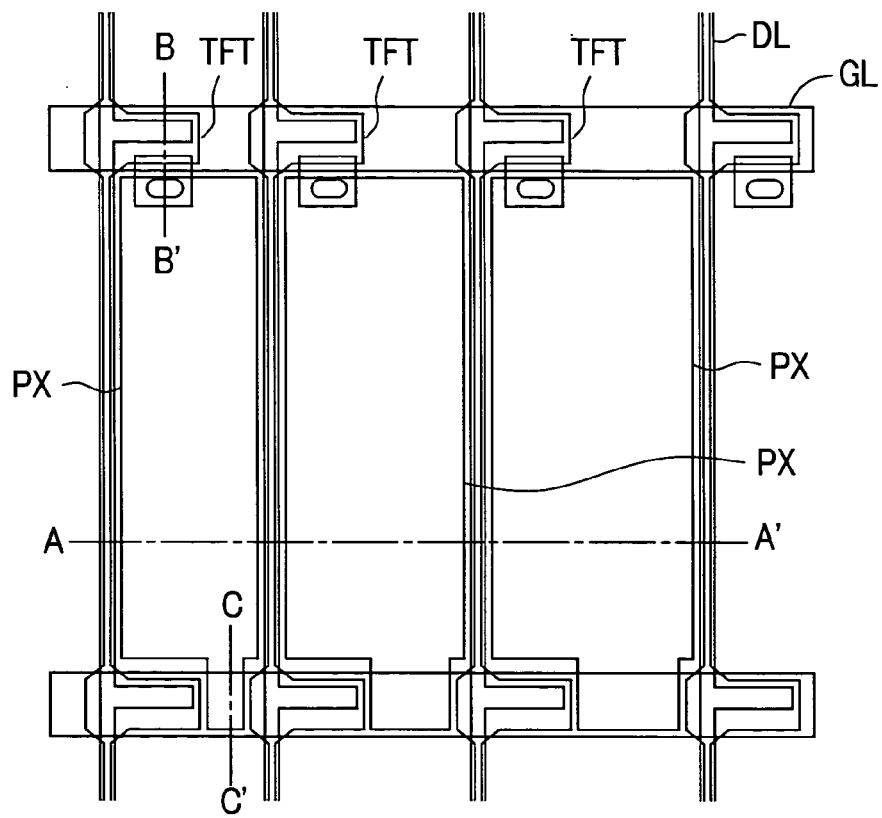

FIG. 1A is a plan view showing the specific constitution of three neighboring pixels out of the above-mentioned respective pixels. Three pixels are respectively allocated to red (R), green (G) and blue (B) and constitute a unit pixel in a color display.

In each pixel, the light-transmitting pixel electrode PX made of, for example, ITO (Indium Tin Oxide), ITZO (Indium Tin Zinc Oxide), IZO (Indium Zinc Oxide), $SnO_2$ (tin oxide) or $In_2O_3$ (indium oxide) which is formed over the substantially whole region of the pixel is connected with the drain signal line DL through the thin film transistor TFT, while the thin film transistor TFT is formed in an overlapped manner on the gate signal line GL which drives the thin film transistor TFT. This is because a portion of the gate signal line GL is configured to function as a gate electrode of the thin film transistor TFT.

Accordingly, a numerical aperture (a light transmitting quantity) of each pixel substantially corresponds to an area of a region which is surrounded by a pair of gate signal lines GL and a pair of drain signal lines DL which surround each pixel. Using each pixel electrode PX which is formed over the substantially whole area of the region and the counter electrode (not shown in the drawing) which is formed on a liquid-crystal side of another substrate with the liquid crystal therebetween in common with respective pixels, an electric field is generated in the liquid crystal and the optical transmissivity of the liquid crystal is controlled in response to the electric field.

Then, as shown in FIG. 1A, three respective pixels which are respectively allocated to red (R), green (G) and blue (B) are formed such that areas each of which is surrounded by the pair of gate signal lines GL and the pair of drain signal lines DL differ from each other. This relationship is adopted by other unit pixel for color display in the same manner.

In FIG. 1A, for example, the pixel at the left side in the drawing is allocated to red, the pixel at the right side in the drawing is allocated to blue, and the pixel at the center is allocated to green.

Figure 1B:
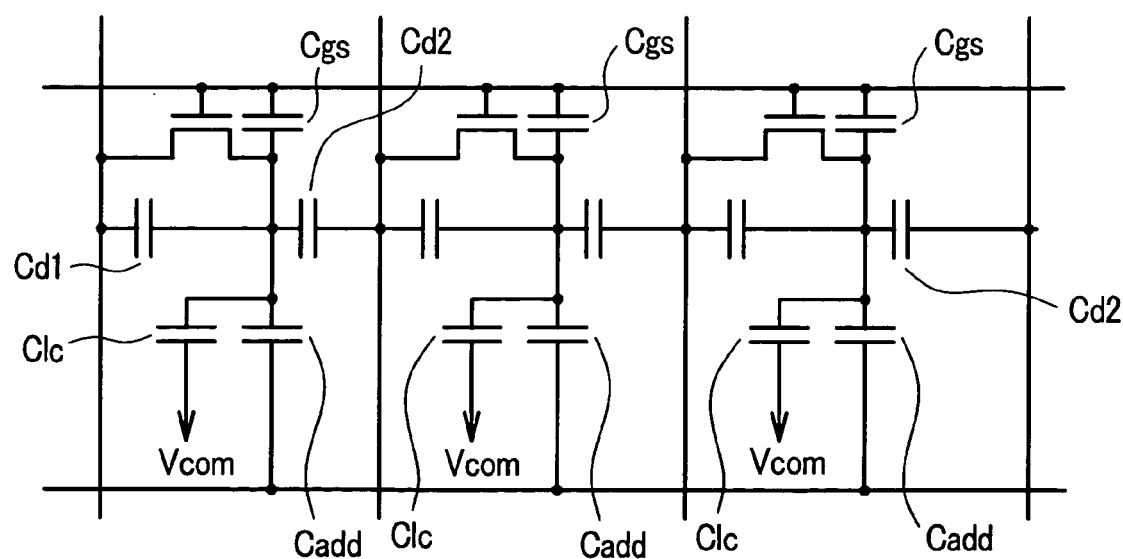

FIG. 1B is a view showing the unit pixel for color display shown in FIG. 1A using an equivalent circuit. In the region which is surrounded by the pair of neighboring gate signal lines GL and the pair of neighboring drain signal lines DL, the connection relationship between the thin film transistor TFT and the pixel electrode PX is set as described above. This drawing also show that a capacitance element Cadd is formed between the pixel electrode PX and another gate signal line GL which is different from the gate signal line GL which drives the thin film transistor TFT.

The capacitance element Cadd is formed for several purposes such as storage of the video signal supplied to the pixel electrode PX for a relatively long time.

Further, the drawing shows a capacitance Clc which is formed between the pixel electrode PX and the counter electrode CT which interpose the liquid crystal therebetween, a capacitance Cgs between the gate signal line GL and a source electrode (an electrode at a side which is connected with the pixel electrode PX) as a parasitic capacitance, a capacitance Cd1 between the thin film transistor TFT and the source electrode (the pixel electrode PX) and one-side drain signal line DL, and a capacitance Cd2 between the thin film transistor TFT and the source electrode (the pixel electrode PX) and another-side drain signal line DL.

Here, when the magnitudes (optical transmissivities, numerical apertures) of these pixels are not equal, the capacitances of respective pixels (pixel capacitances) are formed differently from each other. To render these magnitudes equal, it is necessary to correct using at least either one of the capacitance Cgs and Cadd. This operation is described later.

FIG. 5A is a cross-sectional view taken along a line A–A' in the plan view shown in FIG. 1A.

A semiconductor layer AS which constitutes the thin film transistor TFT is formed on a liquid-crystal-side surface of the substrate SUB1 by way of an insulation film GI, wherein the thin film transistor TFT is driven by the gate signal line GL (not shown in the drawing) which is formed below the insulation film GI. On an upper surface of the thin film transistor TFT, a protective film PAS is formed such that the protective film PAS also covers the thin film transistor TFT, while the pixel electrode PX is formed on a surface of the protective film PAS. The pixel electrode PX is connected with the source electrode (the electrode at a side opposite to the electrode to which the drain signal line DL is connected) of the thin film transistor TFT via a through hole (not shown in the drawing) formed in the protective film PAS. Further, on an upper surface of the pixel electrode PX, an orientation film PX is formed such that the orientation film PX also covers the pixel electrode PX.

Further, on a liquid-crystal-side surface of the substrate SUB2, color filters FIL which correspond to colors to which the respective pixels are allocated are formed and these color films are formed as color filters FIL(R), FIL(G), FIL(B) corresponding to red, green and blue respectively. On upper surfaces of these color filters FIL, a leveling film OC is formed such that the leveling film OC also covers the color filters FIL. Further, on an upper surface of the leveling film OC, the common electrode CT is formed in common with the respective pixels and an orientation film ORI2 is formed on an upper surface of the counter electrode CT.

Figure 5:
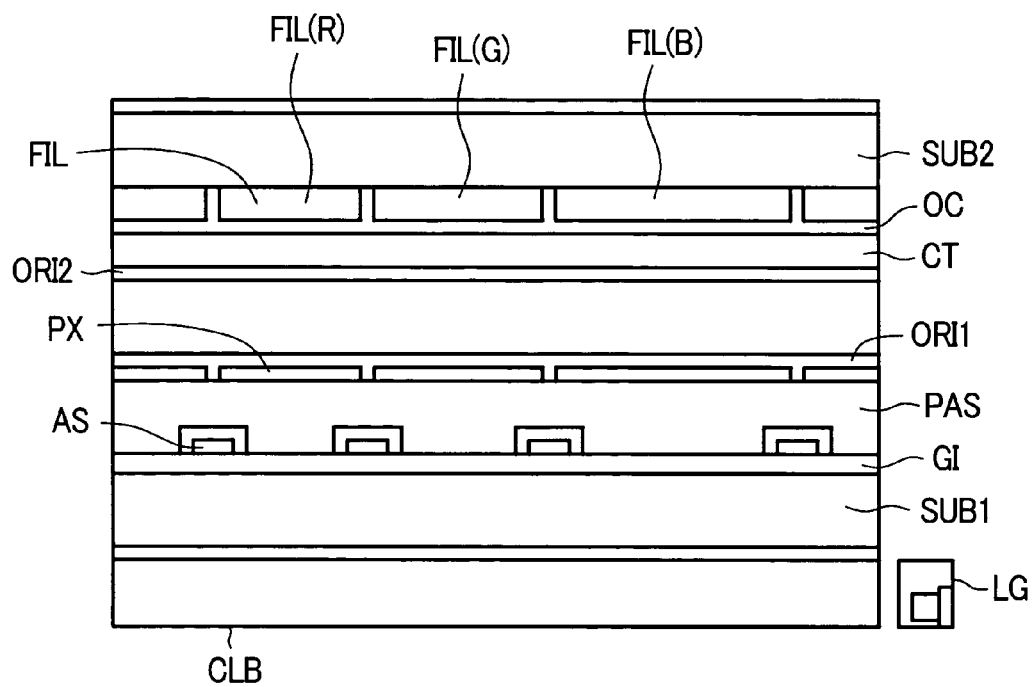
FIG. 5 is a cross-sectional view taken along a line A–A' in FIG. 1A.

Here, in FIG. 5, a light guide plate CLB and a light source (an edge light) of the backlight BL are also shown.

Figure 6:
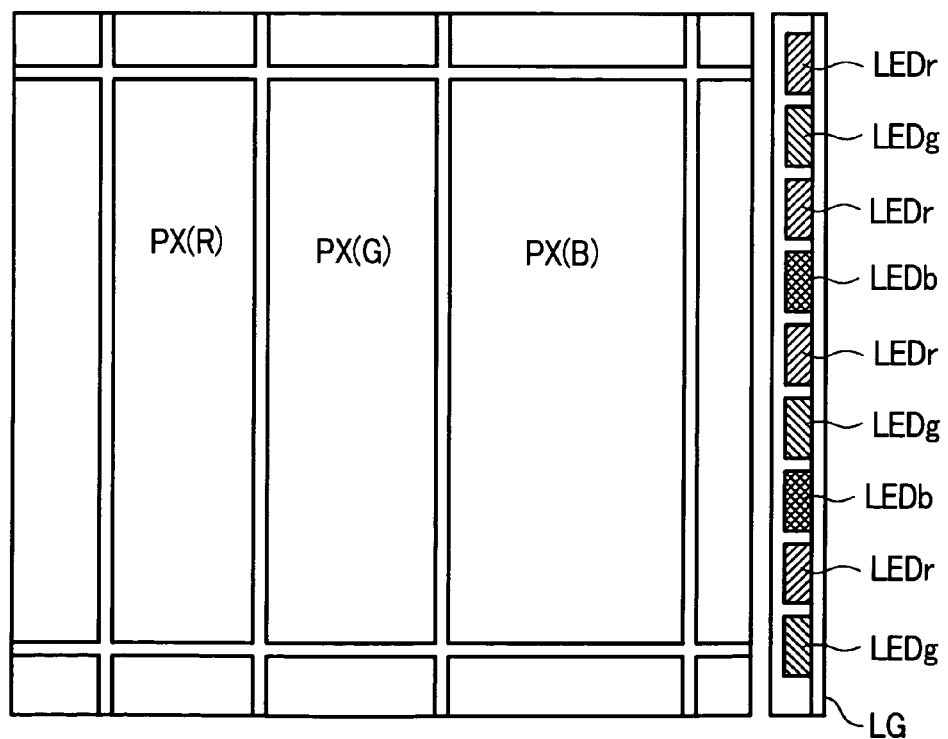
FIG. 6 is a view of a portion shown in FIG. 5 in a plan view.

FIG. 6 is a view of a portion shown in FIG. 5 in a plan view. In the above-mentioned light source LG, a rate of the numbers of red (R) light emitting diodes, green (G) light emitting diodes and blue (G) light emitting diodes which constitute the light source LG is shown.

In the drawing, four red (R) light emitting diodes LEDr, three green (G) light emitting diodes LEDg and two blue (B) light emitting diodes LEDb are arranged.

The rate of the numbers of light emitting diodes of respective colors is determined substantially inversely proportional to the light transmitting quantity (the numerical aperture) of the pixel which is allocated to red (R), the light transmitting quantity (the numerical aperture) of the pixel which is allocated to green (G) and the light transmitting quantity (the numerical aperture) of the pixel which is allocated to blue (B).

Here, the pixel which is allocated to red (R) is shown at the left side in the drawing, the pixel which is allocated to green (G) is shown at the right side in the drawing, and the pixel which is allocated to blue (B) is shown still further to the right side in the drawing.

That is, in the drawing, the rate is determined such that the light transmitting quantity (the numerical aperture) of the pixel which is allocated to red (R) is 2, the light transmitting quantity (the numerical aperture) of the pixel which is allocated to green (G) is 3 and the light transmitting quantity (the numerical aperture) of the pixel which is allocated to blue (B) is 4. In this manner, along with the increase of the light transmitting quantity, the number of light emitting diodes of the color corresponding to the pixels is decreased.

Here, it is not always necessary to strictly determine the relationship between the light transmitting quantities of the respective pixels which are allocated to the respective colors and the numbers of light emitting diodes of respective colors.

Figure 7A:
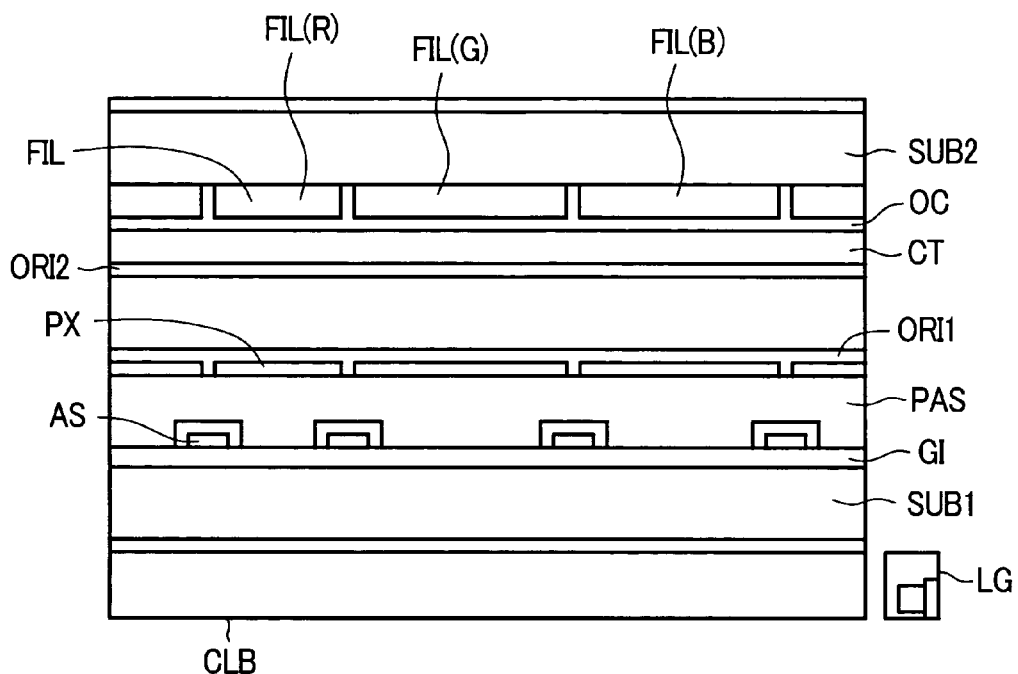
FIG. 7A and FIG. 7B are constitutional views showing another embodiment of the liquid crystal display device according to the invention, wherein FIG. 7A corresponds to FIG. 5 and FIG. 7B corresponds to FIG. 6.
Figure 7B:
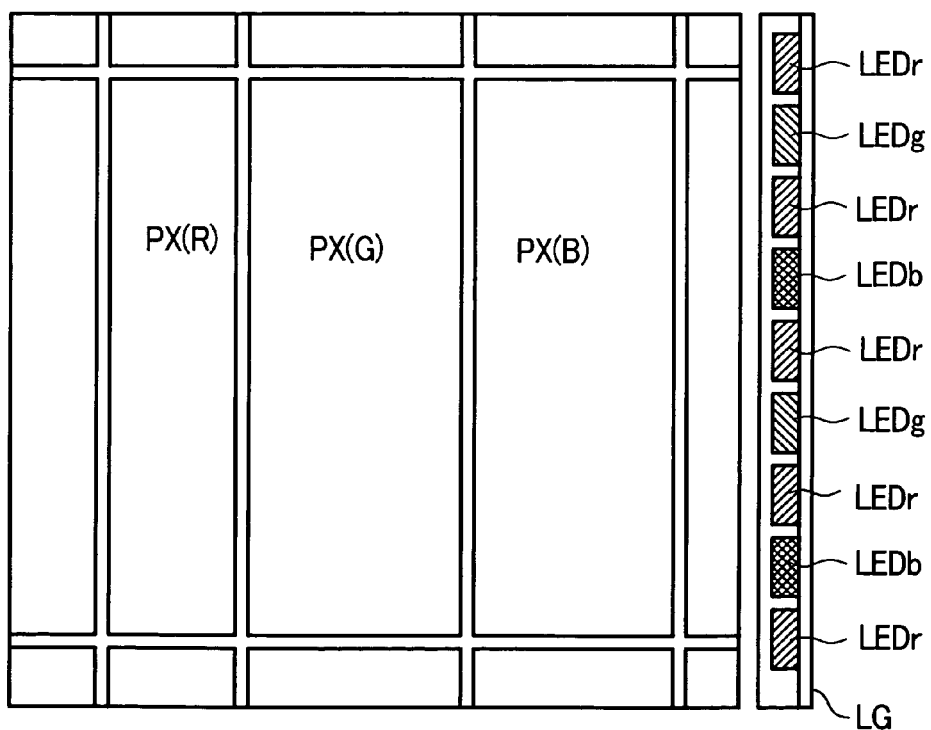

FIG. 7A and FIG. 7B are views corresponding to FIG. 5 and FIG. 6 respectively. In the constitution shown in FIG. 7A and FIG. 7B, the numerical aperture of the pixel allocated to green (G) and the numerical aperture of the pixel allocated to blue (B) are substantially equal and the numerical aperture of the pixel allocated to red (R) is set smaller than these numerical apertures. On the other hand, the rate of the numbers of the red (R) light emitting diodes LEDr, the green (G) light emitting diodes LEDg and the blue (B) light emitting diodes LEDb which constitute the backlight BL is set in the above-mentioned manner. Even when the rate is set in such a manner, a viewer hardly recognizes the change of colors.

Figure 8A:
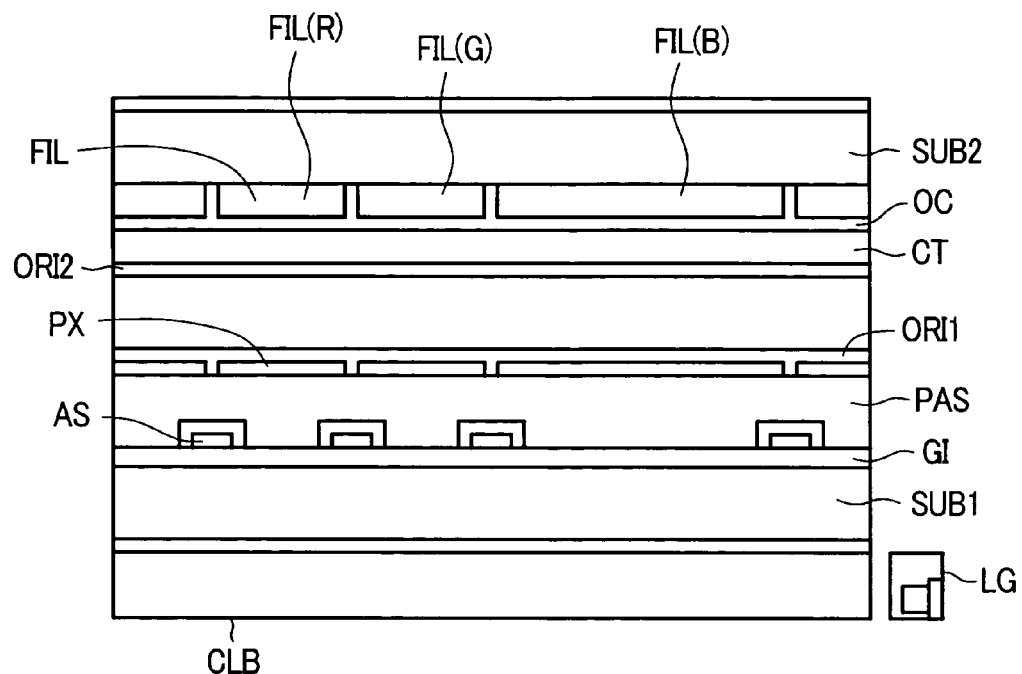
FIG. 8A and FIG. 8B are constitutional views showing another embodiment of the liquid crystal display device according to the invention, wherein FIG. 8A corresponds to FIG. 5 and FIG. 7B corresponds to FIG. 6.
Figure 8B:
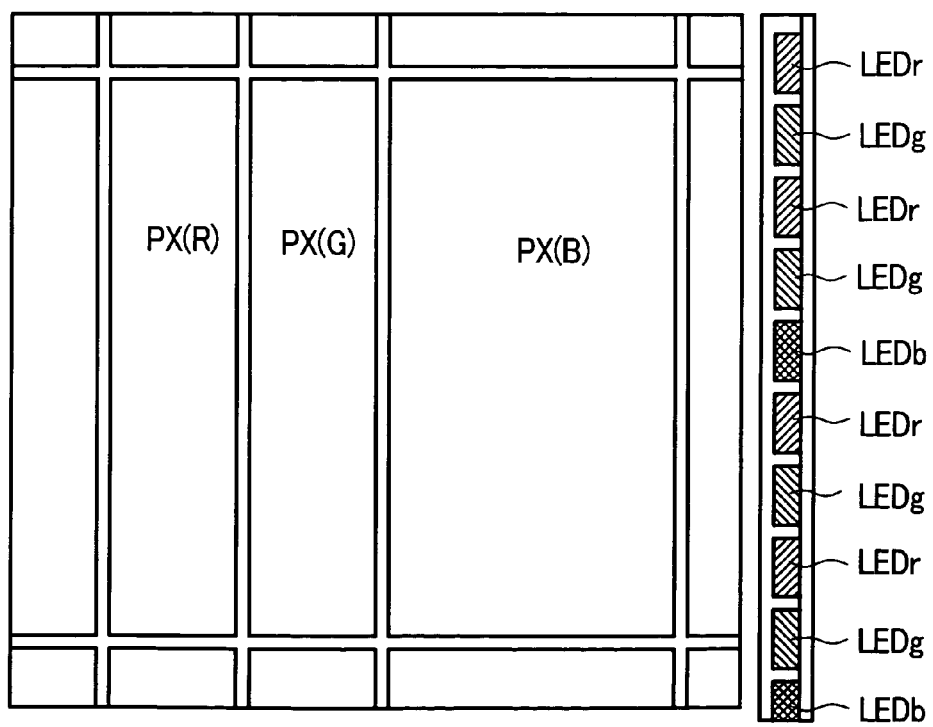

FIG. 8A and FIG. 8B are views corresponding to FIG. 7A and FIG. 7B respectively. In the constitution shown in FIG. 8A and FIG. 8B, the numerical aperture of the pixel allocated to red (R) and the numerical aperture of the pixel allocated to green (G) are substantially equal and the numerical aperture of the pixel allocated to blue (B) is set larger than these numerical apertures. On the other hand, the rate of the numbers of the red (R) light emitting diodes LEDr, the green (G) light emitting diodes LEDg and the blue (B) light emitting diodes LEDb which constitute the backlight BL may be set to 4, 4, 2 sequentially, for example.

Figure 9A:
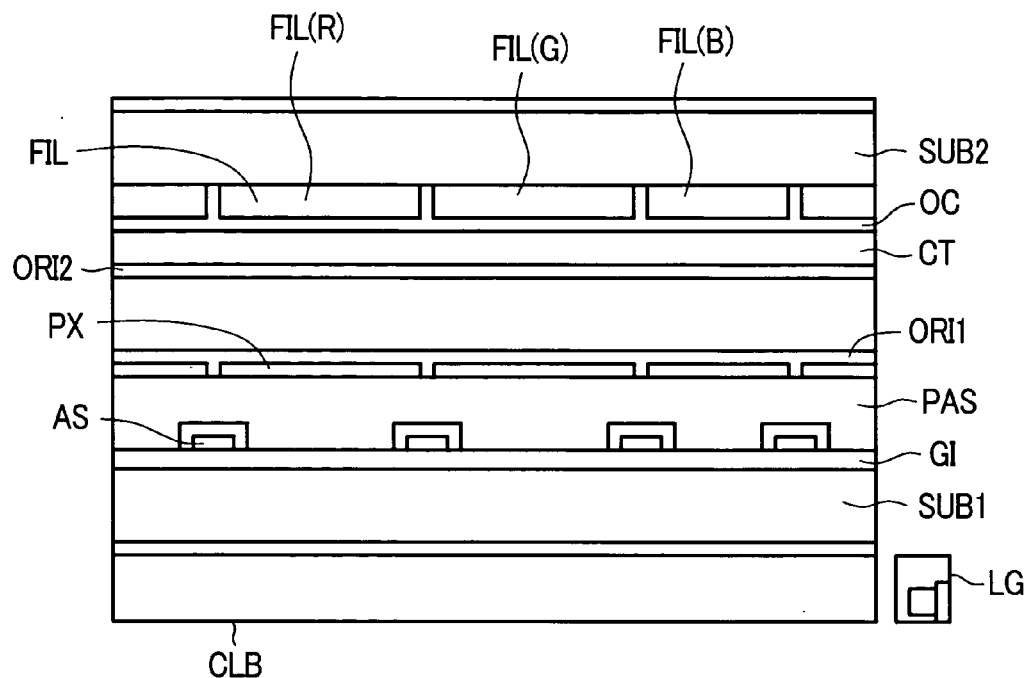
FIG. 9A and FIG. 9B are constitutional views showing another embodiment of the liquid crystal display device according to the invention, wherein FIG. 9A corresponds to FIG. 5 and FIG. 9B corresponds to FIG. 6.
Figure 9B:
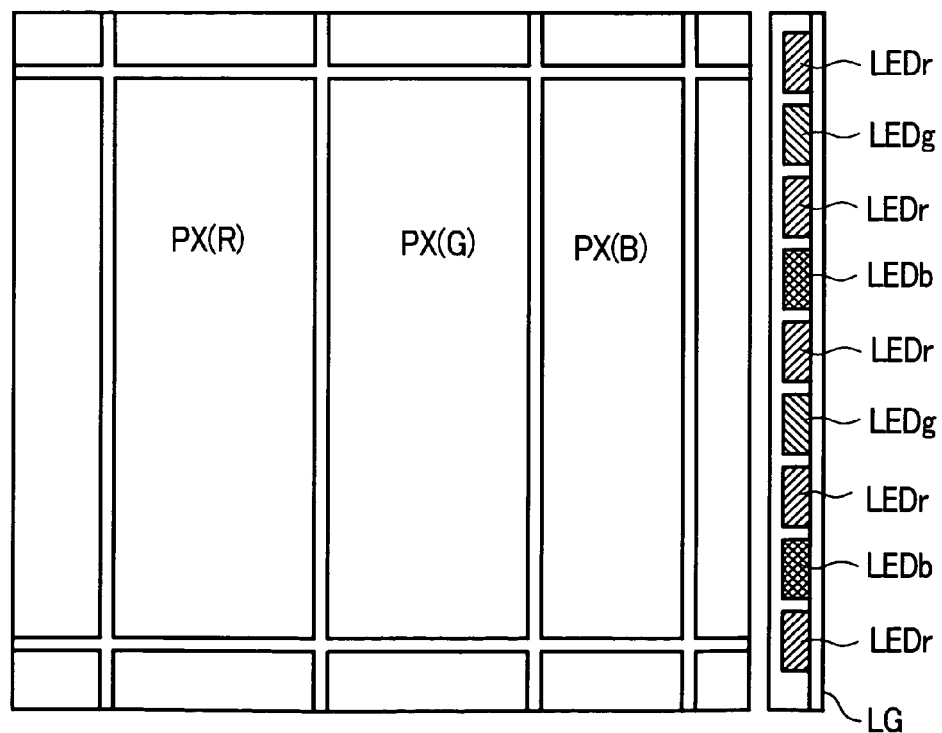

FIG. 9A and FIG. 9B are views corresponding to FIG. 7A and FIG. 7B respectively. In the constitution shown in FIG. 9A and FIG. 9B, the numerical aperture of the pixel allocated to red (R) and the numerical aperture of the pixel allocated to green (G) are substantially equal and the numerical aperture of the pixel allocated to blue (B) is set smaller than these numerical apertures. On the other hand, the rate of the numbers of the red (R) light emitting diodes LEDr, the green (G) light emitting diodes LEDg and the blue (B) light emitting diodes LEDb which constitute the backlight BL may be set to 5, 2, 2 sequentially, for example.

Figure 10A:
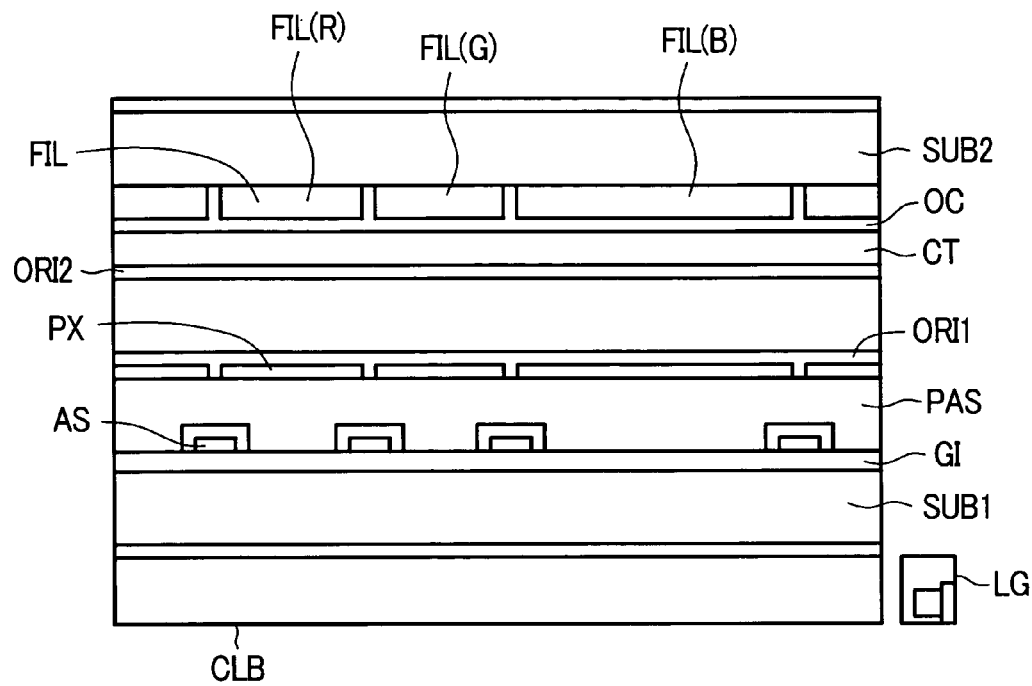
FIG. 10A and FIG. 10B are constitutional views showing another embodiment of the liquid crystal display device according to the invention, wherein FIG. 10A corresponds to FIG. 5 and FIG. 10B corresponds to FIG. 6.
Figure 10B:
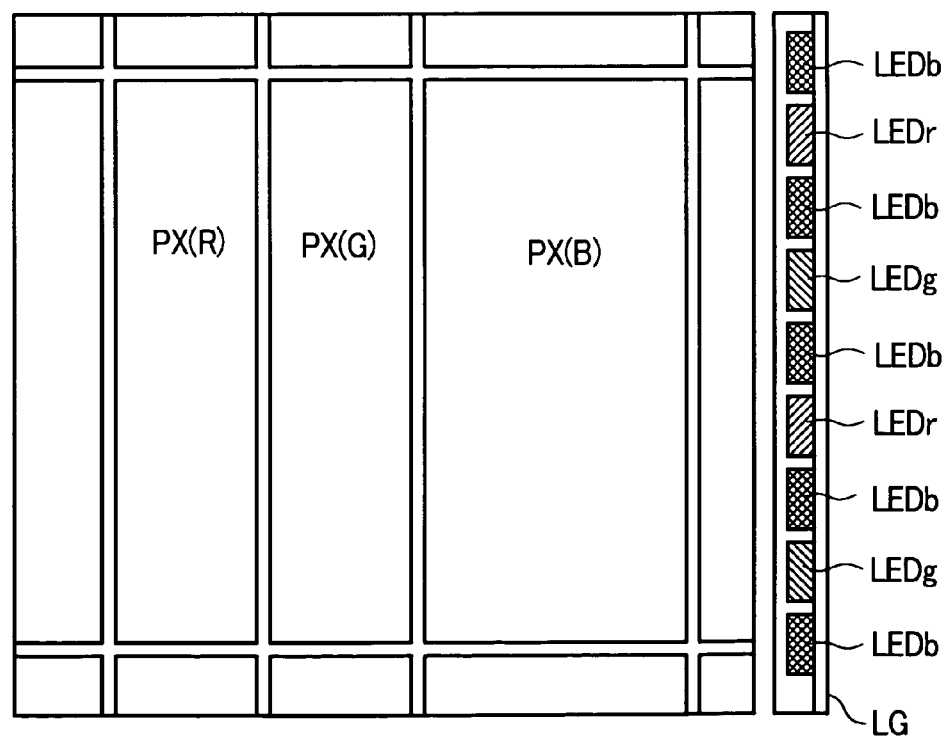

FIG. 10A and FIG. 10B are views corresponding to FIG. 7A and FIG. 7B respectively. In the constitution shown in FIG. 10A and FIG. 10B, the numerical aperture of the pixel allocated to red (R) and the numerical aperture of the pixel allocated to green (G) are substantially equal and the numerical aperture of the pixel allocated to blue (B) is set larger than these numerical apertures. On the other hand, the rate of the numbers of the red (R) light emitting diodes LEDr, the green (G) light emitting diodes LEDg and the blue (B) light emitting diodes LEDb which constitute the backlight BL may be set to 2, 2, 5 sequentially, for example.

Figure 11:
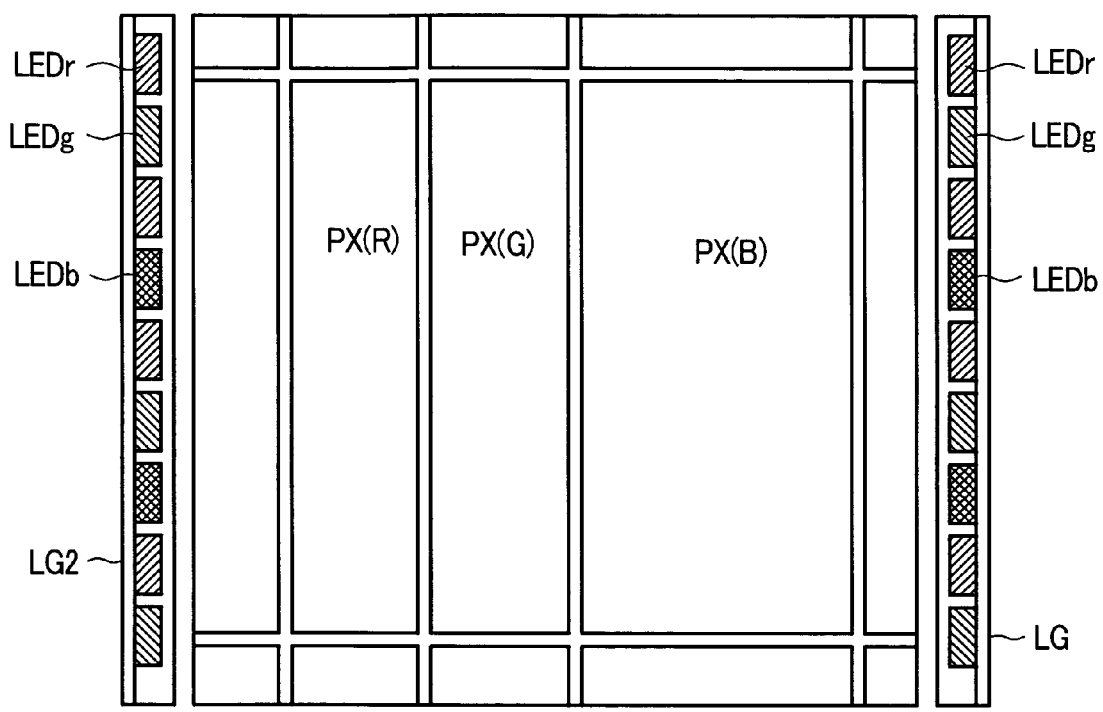
FIG. 11 is a constitutional view showing another embodiment of the liquid crystal display device according to the invention and corresponds to FIG. 10B.

FIG. 11 is, as described above, a view shows the constitution in which in a state that the rate of the numbers of the red (R) light emitting diodes LEDr, the green (G) light emitting diodes LEDg and the blue (B) light emitting diodes LEDb which constitute the light source LG is fixed, to enhance the intensity of light of the backlight BL per se, another light source LG2 which is constituted of red (R) light emitting diodes LEDr, green (G) light emitting diodes LEDg and blue (B) light emitting diodes LEDb arranged in the same rate is provided to a side surface of the light guide plate at a side opposite to the light source LG.

In the drawing, although the constitution is depicted such that the respective light sources are arranged at both sides of the unit pixel for color display for the sake of brevity, in an actual state, the respective light sources are arranged along side surfaces of the respective sides of the light guide plate CLB shown in FIG. 2.

Figure 12:
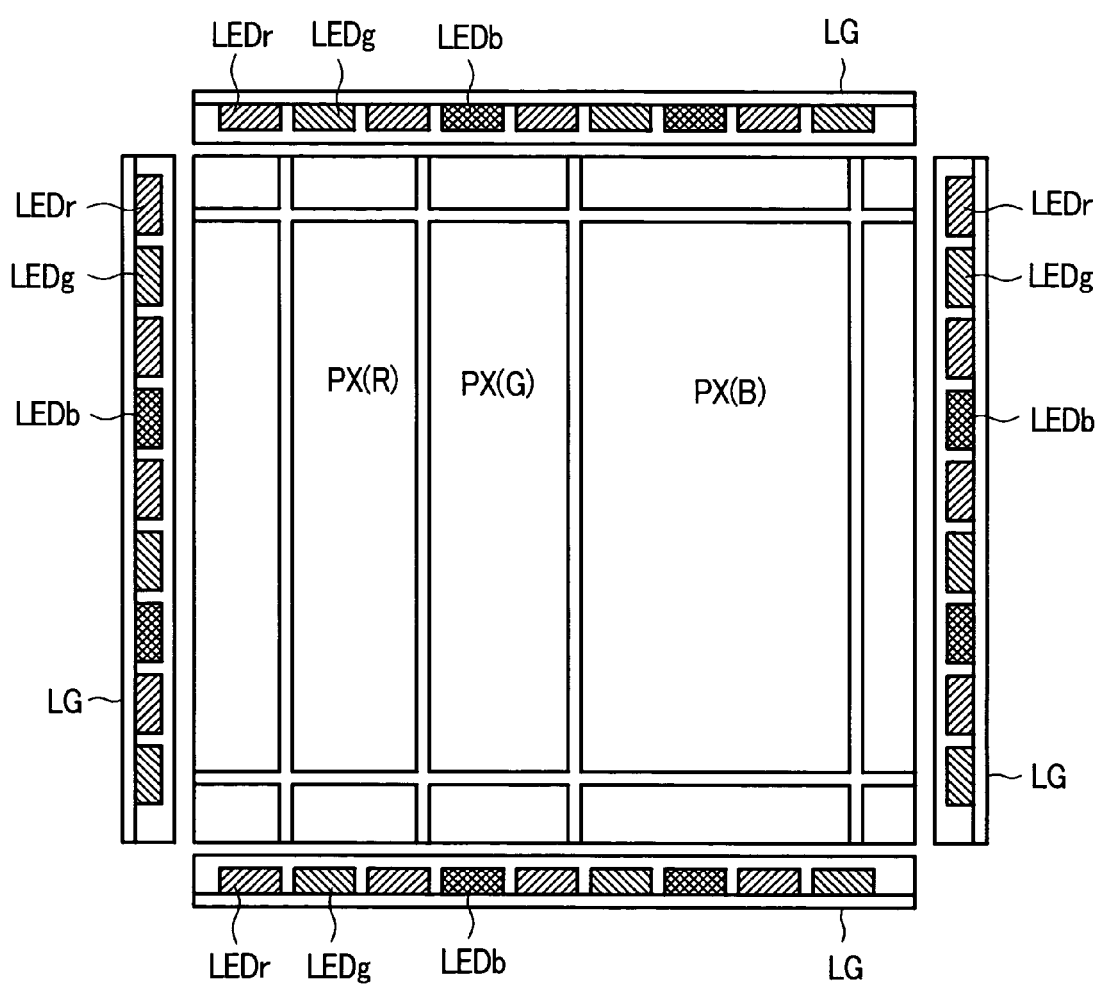
FIG. 12 is a constitutional view showing another embodiment of the liquid crystal display device according to the invention and corresponds to FIG. 10B.

FIG. 12 shows the constitution in which, to further enhance the intensity of light of the backlight BL per se, the light sources LG are arranged along side surfaces of four respective sides of the light guide plate CLB, wherein the rate of the numbers of the red (R) light emitting diodes LEDr, the green (G) light emitting diodes LEDg and the blue (B) light emitting diodes LEDb along the respective sides of the light guide plate CLB is set equal to the corresponding rates of above-mentioned constitutions.

Here, it is needless to say that the rate of the numbers of the red (R) light emitting diodes LEDr, the green (G) light emitting diodes LEDg and the blue (B) light emitting diodes LEDb is set based on the numerical apertures (the light transmitting quantities) of the pixel allocated to red (R), the pixel allocated to green (G) and the pixel allocated to blue (B) in the unit pixel for color display.

Figure 13:
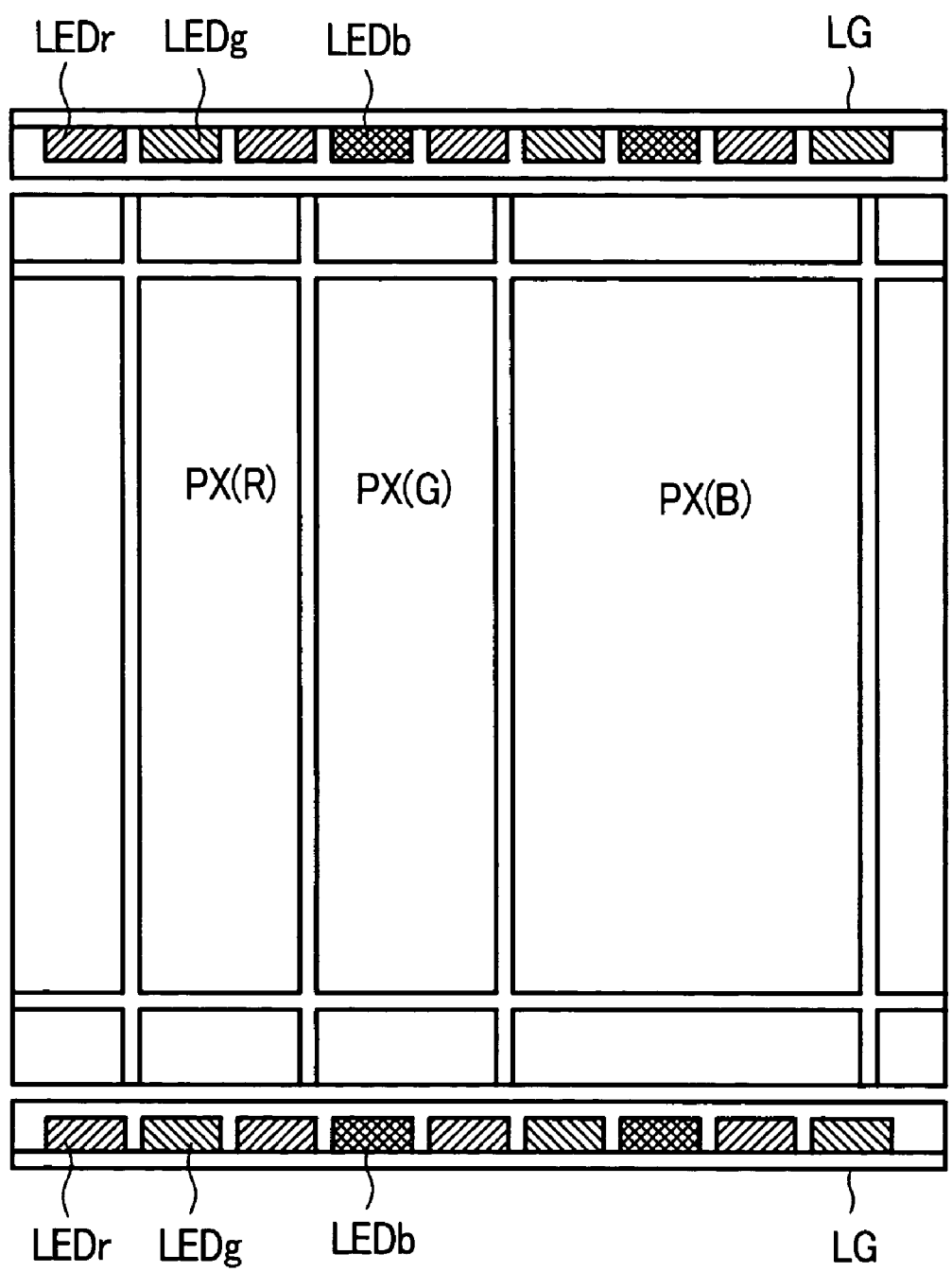
FIG. 13 is a constitutional view showing another embodiment of the liquid crystal display device according to the invention and corresponds to FIG. 10B.

In arranging the light sources at the pair of opposing sides of the light guide plate CLB, although the light sources are arranged at positions corresponding to both lateral sides of the pixel in the above-mentioned constitutions, FIG. 13 shows the constitution in which the light sources are arranged at upper and lower sides of the pixel. In other words, the light emitting diodes LED of the light sources LG are arranged in substantially parallel to the gate signal lines GL which are formed on the liquid crystal display panel PNL.

Figure 14:
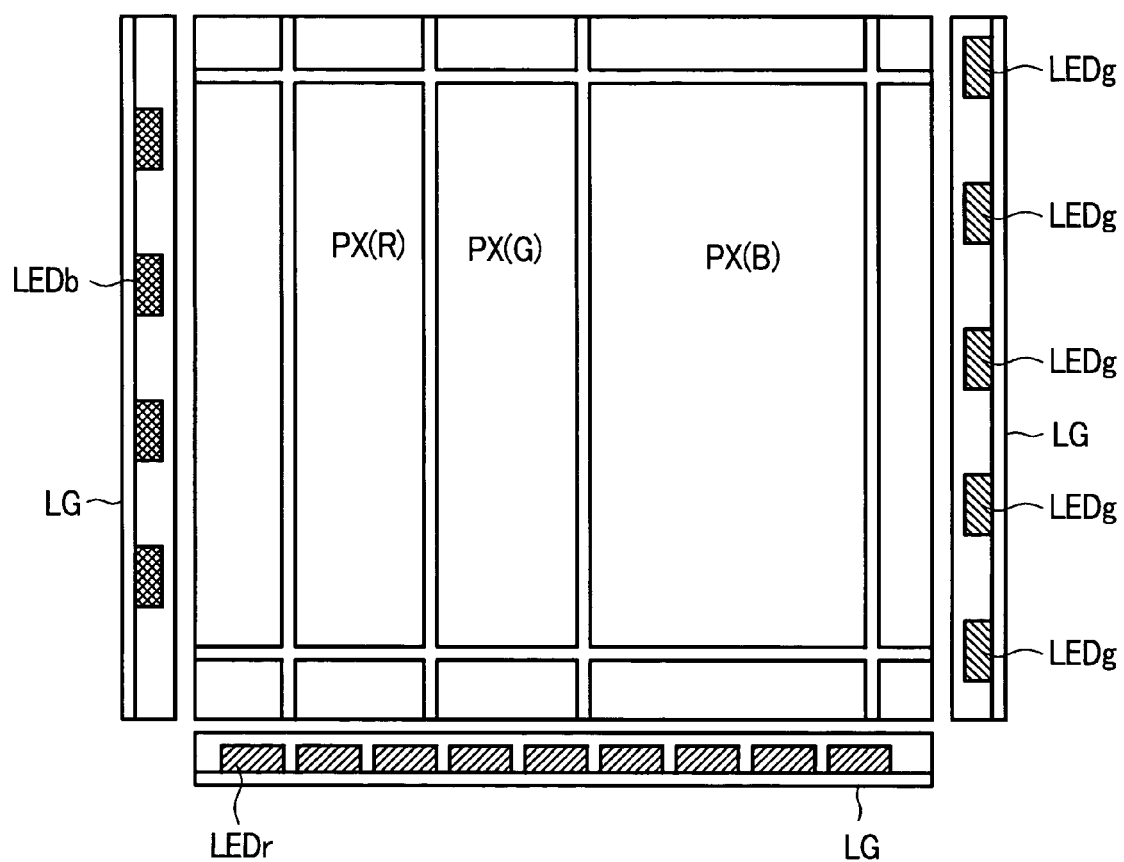
FIG. 14 is a constitutional view showing another embodiment of the liquid crystal display device according to the invention and corresponds to FIG. 10B.

FIG. 14 shows a case in which the light sources LG are respectively arranged along three side faces of the light guide plate CLB except for one side, for example. In this case, the red (R) light emitting diodes LEDr are arranged along one side, the green (G) light emitting diodes LEDg are arranged along another side, and the blue (B) light emitting diodes LEDb are arranged along another remaining side.

In this case, it is needless to say that, in all light emitting diodes, the rate of numbers of the red (R) light emitting diodes LEDr, the green (G) light emitting diodes LEDg and the blue (B) light emitting diodes LEDb is determined based on the numerical apertures (the light transmitting quantity) of the pixels which are allocated to red (R), the pixels which are allocated to green (G) and the pixels which are allocated to blue (B) in the unit pixel for color display.

Figure 15A:
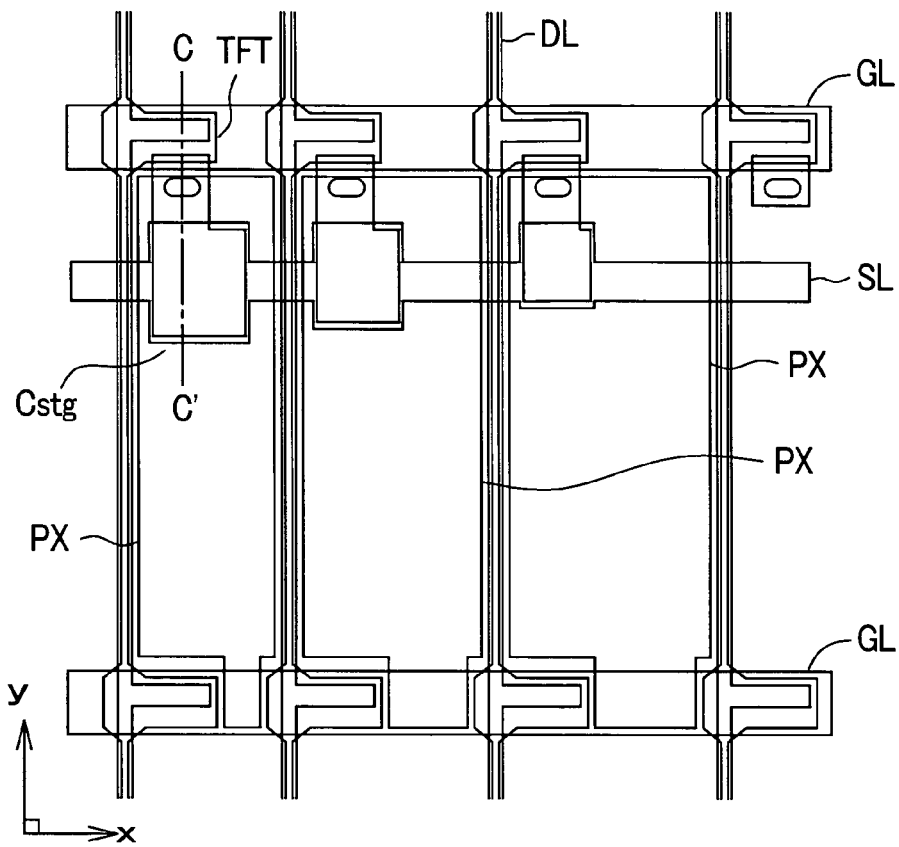
FIG. 15A and FIG. 15B are constitutional views showing another embodiment of the pixel of the liquid crystal display device according to the invention, wherein FIG. 15A corresponds to FIG. 1A and FIG. 15B corresponds to FIG. 1B.

FIG. 15A is a plan view showing another embodiment of the pixel of the liquid crystal display device according to the invention. In this case also, FIG. 15A shows a unit pixel for color display and corresponds to FIG. 1A, for example.

First of all, the constitution which makes this embodiment different from the constitution shown in FIG. 1A lies in the formation of a storage signal line SL which is formed in common with respect to the insides of respective pixels which are arranged in the x direction in the drawing.

The storage signal line SL is formed on the same layer and is formed of the same material as the gate signal line GL, for example, and a capacitance element Cstg is formed between the storage signal line SL and the source electrode (the pixel electrode) of each thin film transistor TFT. A dielectric film of the capacitance element Cstg constitutes an insulation film GI which is interposed between the storage signal line SL and the source electrode.

In this case, areas (regions each of which is surrounded by the pair of neighboring gate signal lines GL and the pair of neighboring drain signal lines DL) which three pixels forming the unit pixel for color display occupy are set different from each other. This is because, as described above, the numerical apertures (the light transmitting quantities) of the pixels which are allocated to respective colors corresponding to the respective numbers of the light emitting diodes LED of respective colors incorporated in the backlight BL are changed.

In this case, capacitance values of the capacitance elements Cstg of three respective pixels which constitute the unit pixel for color display are also set values different from each other. That is, the capacitance element Cstg of pixel having the small area exhibits the large capacitance value and the capacitance values of the capacitance elements are Cstg decreased along with the increase of areas of the pixels.

Here, since the capacitance element Cstg of each pixel is formed by an overlapped region of the storage signal line SL and the source electrode, the capacitance value can be changed by changing the area of overlapped region.

This is because that when the area of the pixel is decreased (or increased), the pixel capacitance including the capacitance element Cstg is decreased (or increased) and hence, the capacitance of the capacitance element Cstg is increased (or decreased) to set the pixel capacitances of respective pixels substantially equal.

Figure 15B:
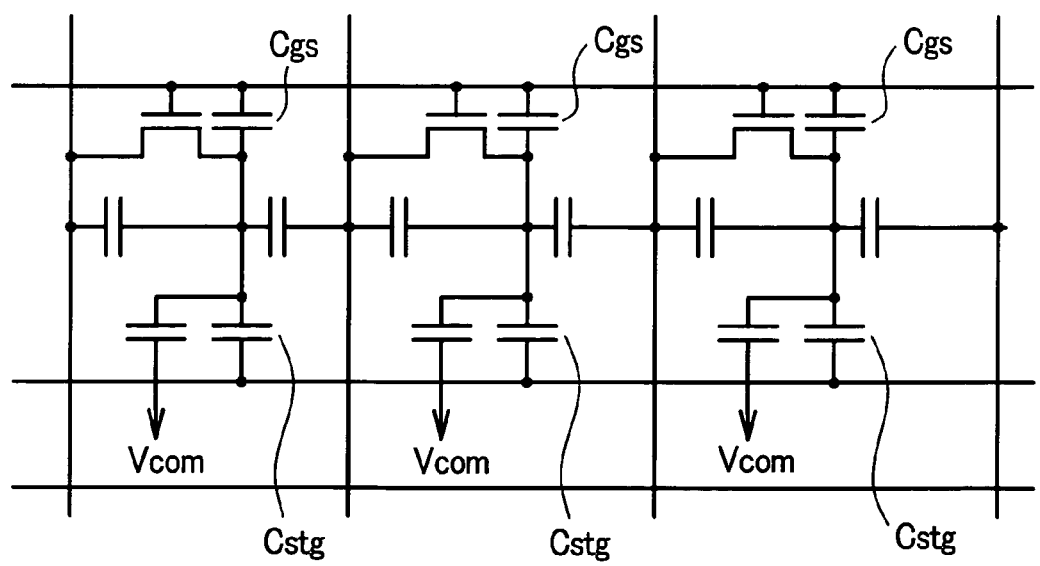

FIG. 15B is a view showing the constitution shown in FIG. 15A as an equivalent circuit. In the drawing, the capacitance elements Cstg and the parasitic capacitances Cgs of respective pixels for color display differ from each other in response to the light transmitting quantities or the numerical apertures of the respective pixels.

Figure 16:
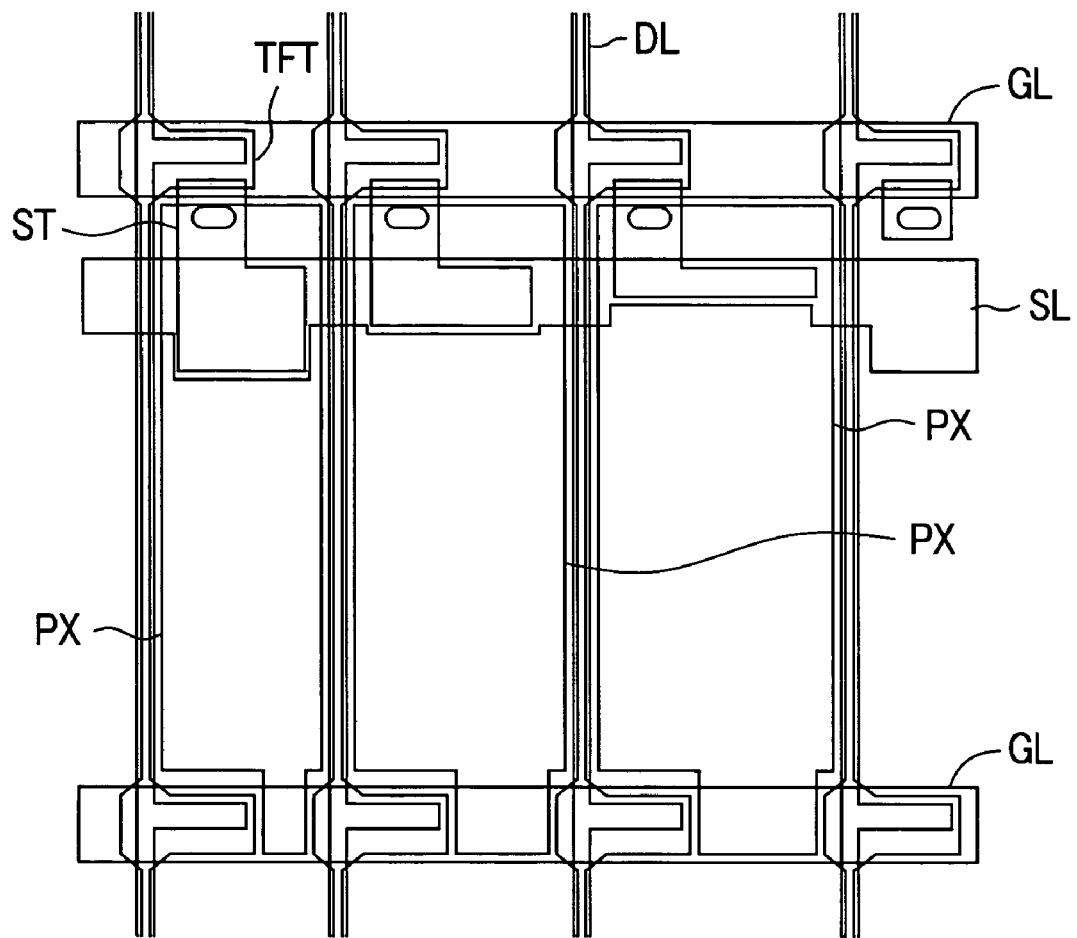
FIG. 16 is a constitutional view showing another embodiment of the pixel of the liquid crystal display device according to the invention and also is a plan view relating to an improvement of the constitution shown in FIG. 15A.

FIG. 16 is a plan view showing another embodiment which is an improvement of the constitution shown in FIG. 15A.

The constitution which makes this embodiment different from the constitution shown in FIG. 15A lies in that when the capacitance values of the capacitance elements Cstg of the respective pixels are changed, the change of a width between opposing sides of the gate signal line GL and the storage signal line SL which is arranged neighboring to the gate signal line GL is suppressed as much as possible.

That is, when the overlapped region portions of the storage signal line SL and the source electrodes ST are projected in the direction orthogonal to the gate signal line GL, the overlapped region portions are projected to the center side of the pixel region and are not projected to the gate signal line GL side. In this case, when the overlapped region portions of the storage signal line SL and the source electrodes ST are projected to the center side of the pixel region, this gives rise to the lowering of the numerical aperture and hence, a projection quantity should be suppressed to a minimum value and, at the same time, the overlapped region portions are extended in the extension direction of the storage signal line SL.

Accordingly, although portion of the storage signal line SL and the portion of the gate signal line GL which face each other slightly differ in length from each other, their widths are equal and hence, it is possible to set the parasitic capacitance between them to a substantially fixed value.

Figure 17A:
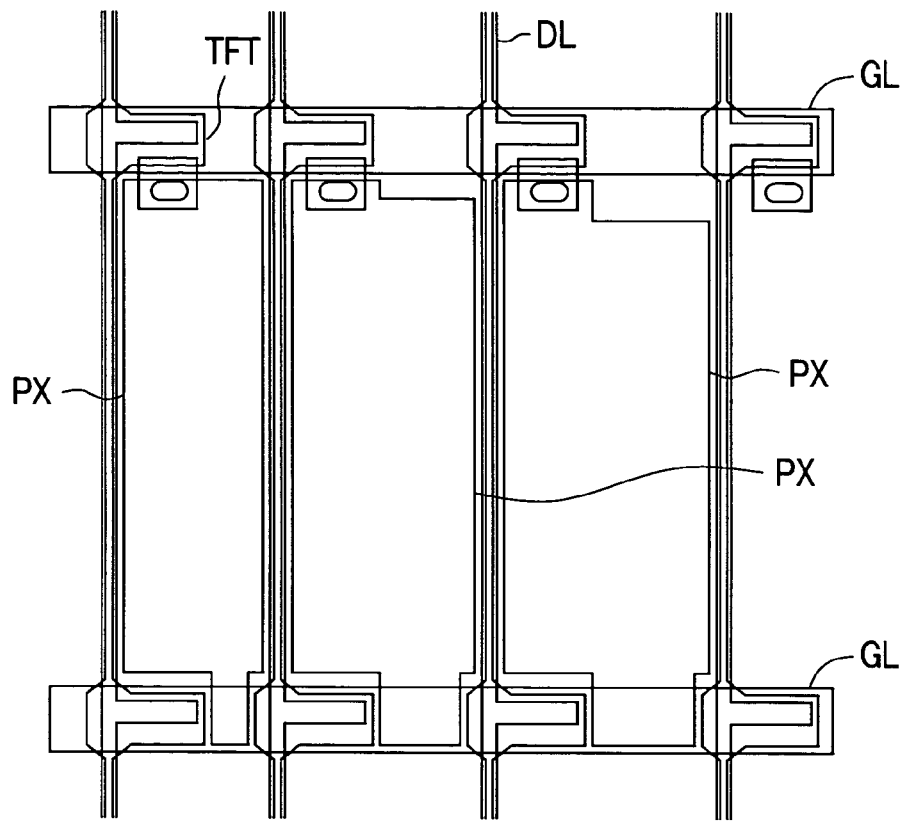
FIG. 17A and FIG. 17B are constitutional views showing another embodiment of the pixel of the liquid crystal display device according to the invention, wherein FIG. 17A corresponds to FIG. 1A and FIG. 17B corresponds to FIG. 1B.

FIG. 17A is a plan view showing another embodiment of the pixel of the liquid crystal display device according to the invention. In this embodiment, the storage signal line SL is not provided to the respective pixels and hence, this embodiment substantially has the same constitution as the embodiment shown in FIG. 1A.

Then, the technical concept shown in FIG. 16 is applied to the pixel having such a constitution.

That is, this embodiment is characterized in that a distance between the gate signal line GL which drives the pixels and the pixel electrode PX which is formed in the pixel is changed along with the size of the areas of the respective pixels.

The pixel having the small area exhibits the small spaced-apart distance between the gate signal line GL and the pixel electrode PX, and the spaced-apart distance between the gate signal line GL and the pixel electrode PX in the pixel is increased along with the increase of the area of the pixel.

In other words, in the pixel in which an opposing length between the gate signal line GL and the pixel electrode PX is small, the spaced-apart distance between the gate signal line GL and the pixel electrode PX is small, and along with the increase of the opposing length between the gate signal line GL and the pixel electrode PX, the spaced-apart distance between the gate signal line GL and the pixel electrode PX in the pixel is increased.

Due to such a constitution, in the respective pixels, it is possible to allow the parasitic capacitances Cgs between the gate signal line GL and the pixel electrode PX to have the substantially same value.

Figure 17B:
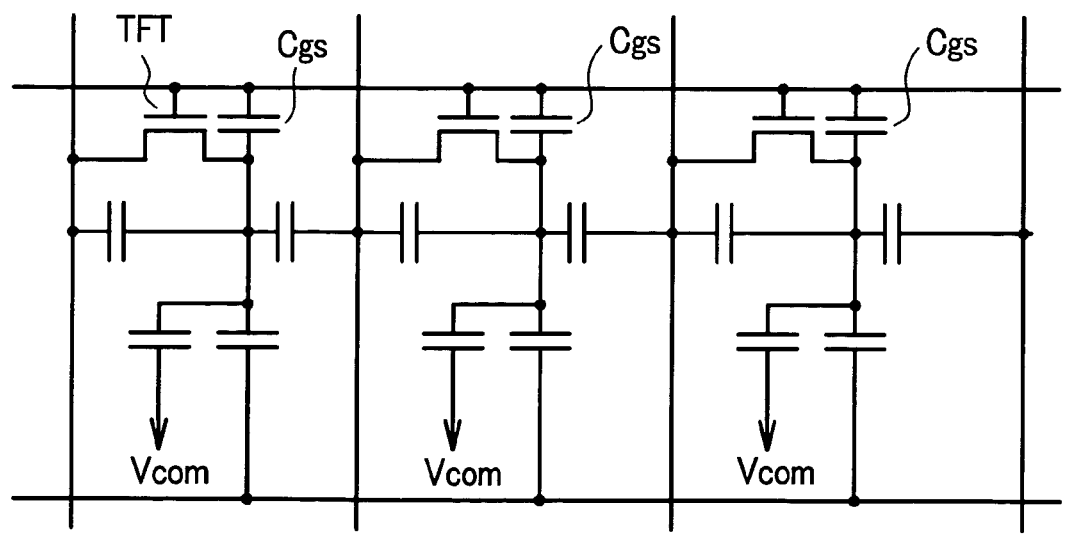

FIG. 17B is a view which shows the constitution shown in FIG. 17A as an equivalent circuit. In the drawing, the parasitic capacitances Cgs of respective pixels for color display are substantially fixed irrespective of the magnitude of the light transmitting quantities or the numerical apertures of the respective pixels.

Figure 18A:
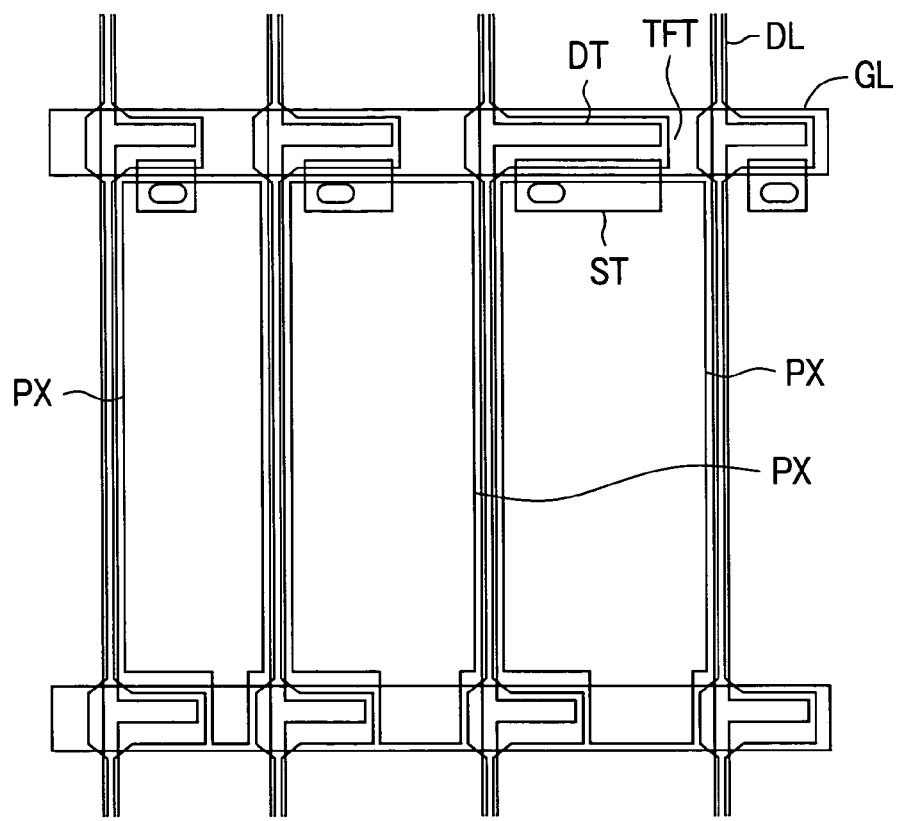
FIG. 18A and FIG. 18B are constitutional views showing another embodiment of the pixel of the liquid crystal display device according to the invention, wherein FIG. 18A corresponds to FIG. 1A and FIG. 18B corresponds to FIG. 1B.

FIG. 18A is a plan view showing another embodiment of the pixel of the liquid crystal display device according to the invention. This drawing corresponds to FIG. 1A and describes the constitution having no storage signal lines SL. However, this embodiment is applicable to the liquid crystal display device in which storage signal lines SL are formed.

This embodiment described in FIG. 18A is characterized by the thin film transistors TFT provided to each pixel. That is, the thin film transistors TFT of three respective pixels which constitute a unit pixel of the color display have channels which differ in width from each other, wherein the thin film transistor TFT of the pixel having the small area has the small channel width and the channel width of the thin film transistor TFT is increased along with the increase of area of the pixel.

This is because that when the area of the pixel is large, it is necessary to ensure an electric current corresponding to the area and hence, the electric current which flows in the thin film transistor TFT is increased by increasing the channel width of the thin film transistor TFT.

With respect to the constitution shown in FIG. 18A, the thin film transistor TFT is formed on the gate signal line GL in an overlapped manner and the channel width thereof is aligned with the running direction of the gate signal line GL. Accordingly, the drain electrode DT which is connected to the drain signal line DL of each thin film transistor TFT is extended in the running direction of the gate signal line GL with a length corresponding to the area of the pixel, while the source electrode ST which is formed while facing the drain electrode DT is also formed with a width corresponding to the area of the pixel.

Figure 18B:
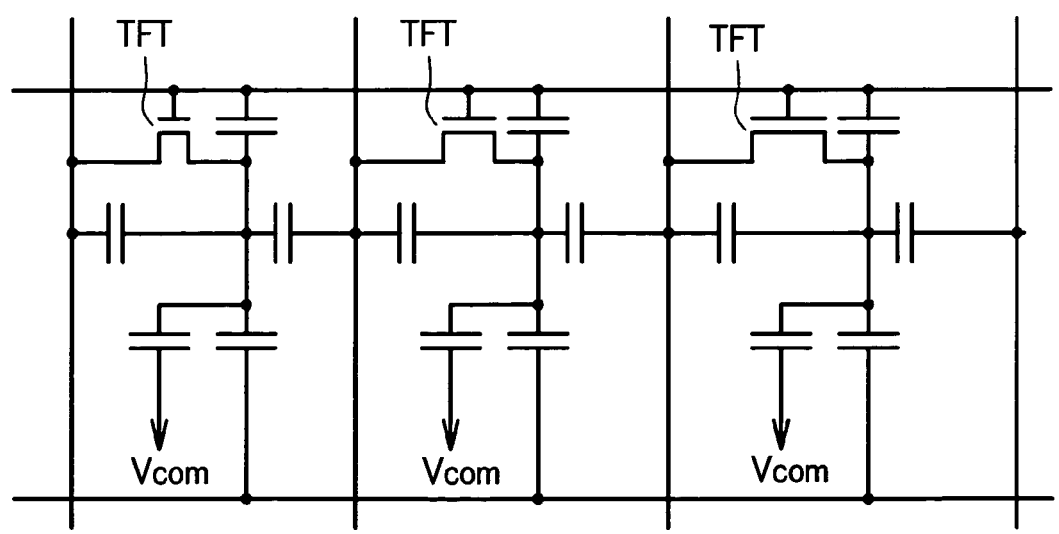

FIG. 18B is a view which shows the constitution shown in FIG. 18A as an equivalent circuit. In the drawing, the thin film transistors TFT of respective pixels for color display differ in the channel width corresponding to light transmitting quantities or numerical apertures of the pixels.

Figure 19:
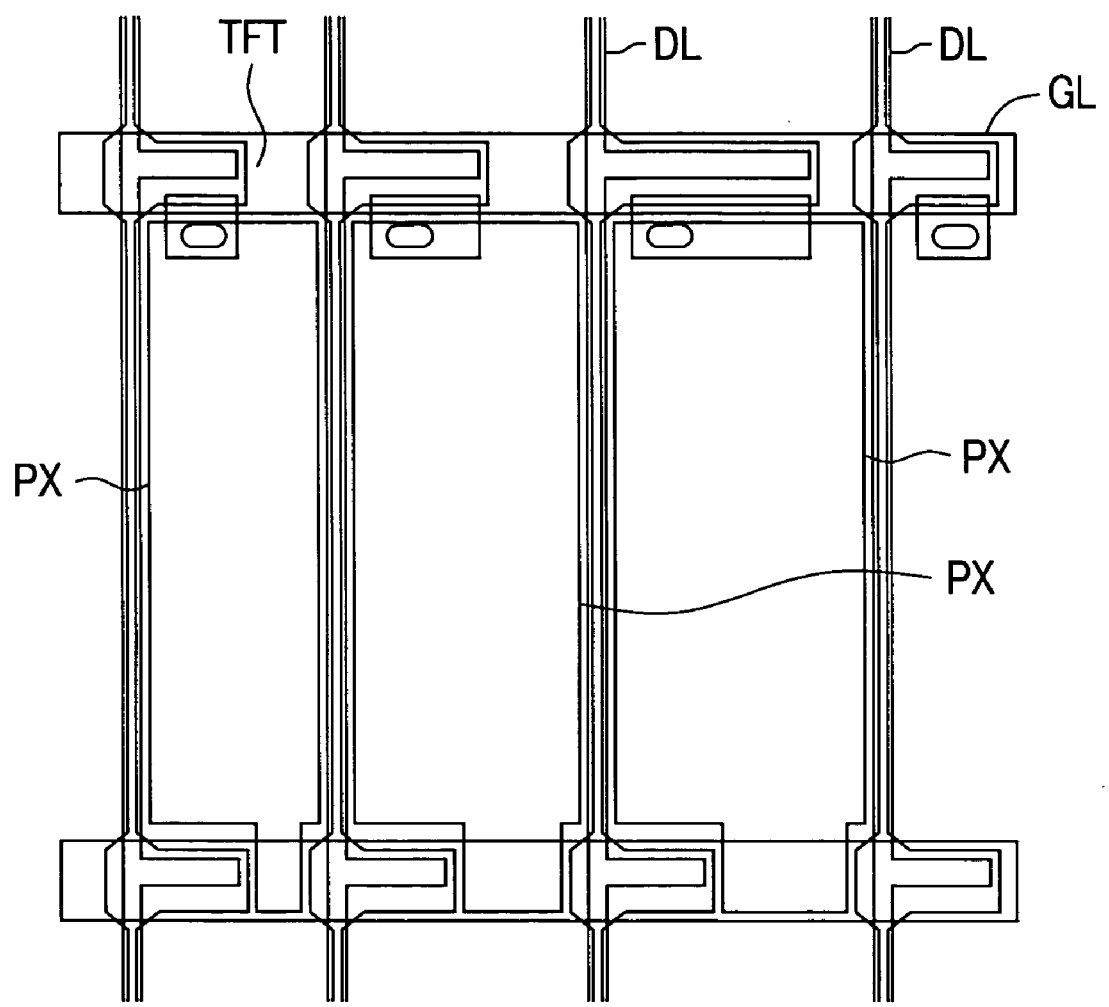
FIG. 19 is a plan view showing an improvement of the constitution shown in FIG. 18A.

FIG. 19 is a plan view which shows the constitution which further improves the constitution shown in FIG. 18A.

The constitution which makes this embodiment different from the constitution shown in FIG. 18A lies in that, in the unit pixel for color display, the widths of the drain signal lines DL which supply video signals to the thin film transistors TFT are increased corresponding to the channel widths of the thin film transistors TFT of respective pixels.

That is, the drain signal line DL which supplies the video signal to the pixel having the thin film transistor TFT with the small channel width has a small width, while the drain signal line DL which supplies video signal to the pixel having the thin film transistor TFT with the large channel width has the large width.

Such a constitution is provided for suppressing the irregularities of pixel capacitances of respective pixels attributed to the delay of signals supplied through the respective drain signal lines DL by changing the widths of the drain signal lines DL in conformity with the pixel capacitances of respective pixels.

Figure 20A:
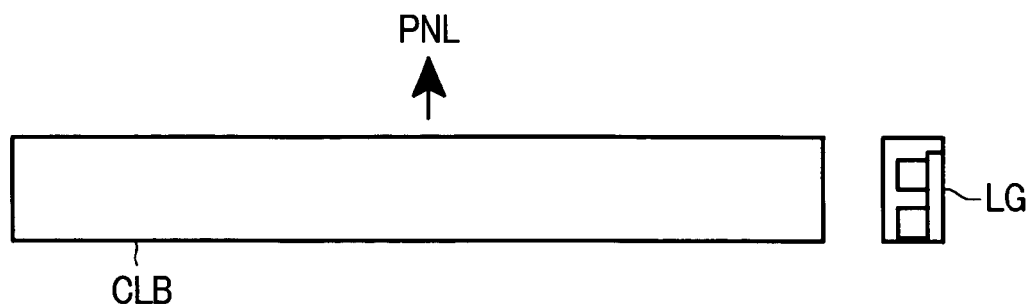
FIG. 20A, FIG. 20B and FIG. 20C are constitutional views showing another embodiment of the backlight of the liquid crystal display device according to the invention.

FIG. 20A is an explanatory view showing another constitution of the backlight BL of the liquid crystal display device according to the invention.

On one side surface of a light guide plate CLB, a light source LG is arranged. In the light source LG, as mentioned above, red (R) light emitting diodes LEDr, green (G) light emitting diodes LEDg and blue (B) light emitting diodes LEDb are arranged by the preset number in parallel in the extending direction of one side surface.

Then, these respective light emitting diodes LED are, in this embodiment, arranged in two rows.

That is, in the above-mentioned one side surface of the light guide plate CLB, the first row (lower row) of light emitting diodes is formed by arranging the light emitting diodes LED of respective colors in parallel along the extending direction of one side surface on the liquid crystal display panel PNL side, while the second row (upper row) of light emitting diodes is formed by arranging light emitting diodes LED of respective colors in parallel along the extending direction of one side surface on the side opposite to the liquid crystal display panel PNL.

Such a constitution is provided for enhancing the intensity of light of the backlight BL. Accordingly, the light source may be constituted not only in two rows but also in three or more rows.

Figure 20B:
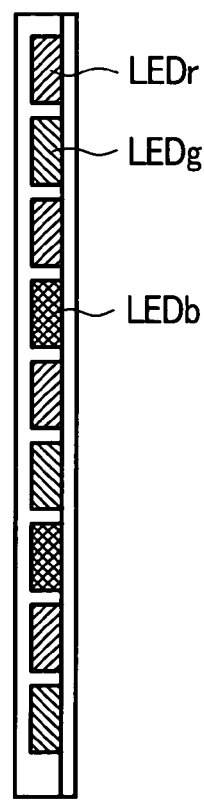
Figure 20C:
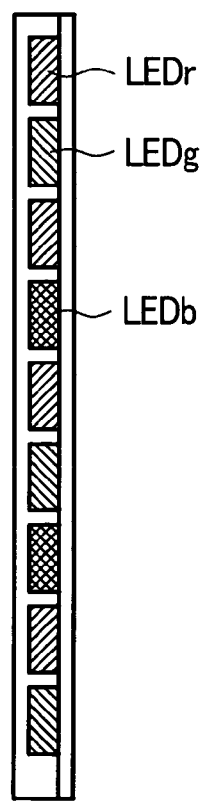

FIG. 20B shows the first row of light emitting diodes and FIG. 20C shows the second row of light emitting diodes. In the first row of light emitting diodes, from one end side thereof, red, green, red, blue, . . . green are arranged, while in the second row of light emitting diodes also, from one end side thereof, red, green, red, blue, . . . green are arranged. These arrangements are exactly the same.

Figure 21A:
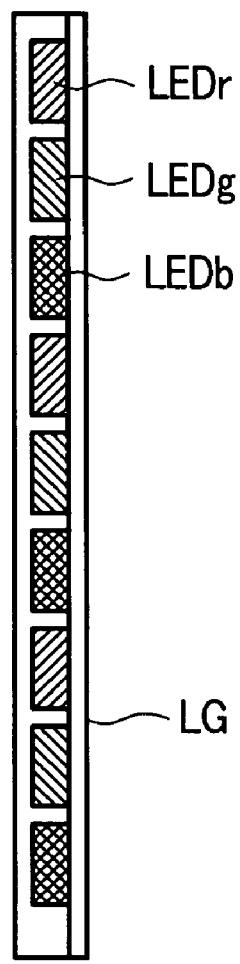
FIG. 21A and FIG. 21B are views showing another embodiment of the backlight of the liquid crystal display device according to the invention and are views which show the arrangement of respective light emitting diodes in respective light emitting diode rows which are arranged in two rows.
Figure 21B:
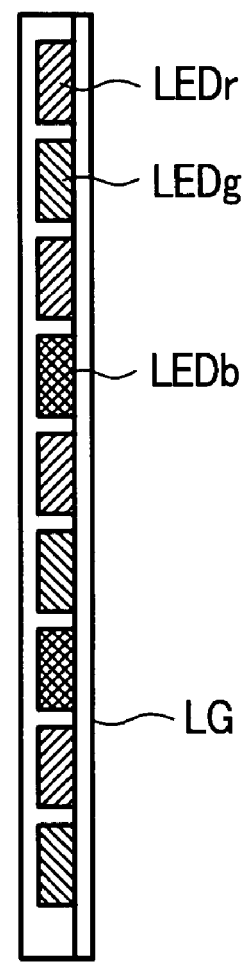

FIG. 21 is a view showing another embodiment of respective rows of light emitting diodes which are arranged in two rows. FIG. 21A shows the first row of light emitting diodes and FIG. 21B shows the second row of light emitting diodes. While the light emitting diodes LED of respective colors are arranged in the first row of light emitting diodes in order of such as, red, green, blue, red, . . . red, green, blue, from one end side thereof such that their numbers are set equal, the light emitting diodes of respective colors are arranged in the second row of light emitting diodes in order of such as, for example, red, green, red, blue, . . . green such that their numbers are set different from each other.

Here, in the same manner as above, the respective numbers of the light emitting diodes LED of respective colors in the second row are determined in accordance with the areas of the pixels which are allocated to colors of the unit pixel for color display.

Further, it is needless to say that the light emitting diodes may be arranged such that the mode of arrangement is exchanged between the first row and the second row.

Figure 22A:
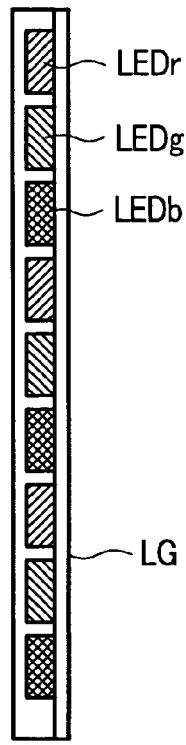
FIG. 22A and FIG. 22B are views showing another embodiment of the backlight of the liquid crystal display device according to the invention and are views which show the arrangement of respective light emitting diodes in respective light emitting diode rows which are arranged in two rows.
Figure 22B:
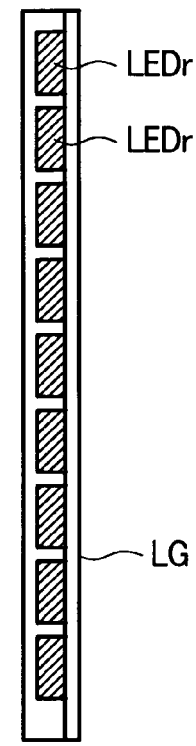

FIG. 22 is a view showing another embodiment of rows of respective light emitting diodes which are arranged in two rows. FIG. 22A shows the first row of light emitting diodes and FIG. 22B shows the second row of light emitting diodes. The light emitting diodes LED of respective colors in the first row of light emitting diodes are arranged such that their numbers are set equal, that is, in order of red, green, blue, red, . . . red, green blue. On the other hand, the light emitting diodes in the second row of light emitting diodes are arranged such that only a plurality of red light emitting diodes are arranged.

In this constitution, in the first row and the second row, the number of the red light emitting diodes is largest and the numbers of the green and blue light emitting diodes are equal to each other and less than the number of the red light emitting diodes. Accordingly, the relationship of the areas of the pixels which are allocated to the corresponding colors in the unit pixel for color display substantially have the relationship corresponding to the above-mentioned numbers of the light emitting diodes.

Here, it is needless to say that the light emitting diodes may be arranged such that the mode of arrangement is exchanged between the first row and the second row.

Figure 23:
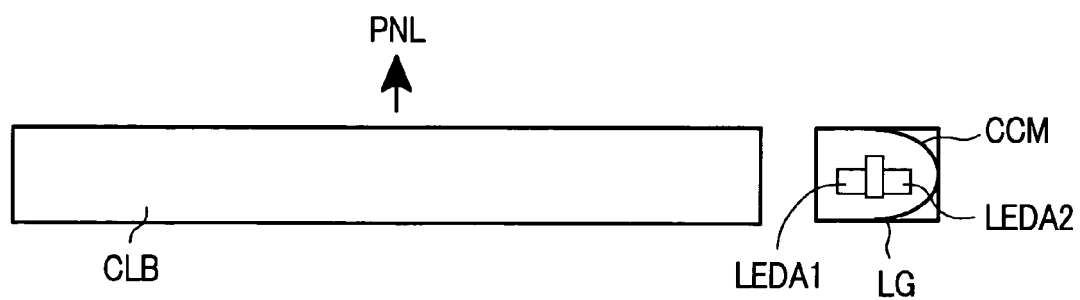
FIG. 23 is a constitutional view showing another embodiment of the backlight of the liquid crystal display device according to the invention.

FIG. 23 is an explanatory view showing another embodiment of the backlight of the liquid crystal display device according to the invention. As shown in this drawing, the light source LG is arranged on one side surface of the light guide plate CLB. This light source LG is constituted of a large number of the light emitting diodes which are arranged in parallel in a longitudinal direction of one side surface and a reflection plate formed of a convex mirror CCM which reflects the light from the light emitting diode to one side surface side.

Here, the above-mentioned light emitting diodes are constituted of the light-guide-plate-side row of light emitting diodes LEDA1 which directly irradiate the light to one side surface of the light guide plate and the opposite-side row of light emitting diodes LEDA2 which irradiate the reflected light to one side surface of the light guide plate by way of the reflection plate. That is, the light-guide-plate-side row of light emitting diodes and the opposite-side row of light emitting diodes are arranged back to back. As a result, this embodiment can obtain the similar advantageous effect as the embodiment in which the row of light emitting diodes are arranged in two vertical rows on one side surface of the light guide plate.

FIG. 24A is an explanatory view showing one embodiment of the arrangement of the diodes of respective colors of the above-mentioned row of light emitting diodes LEDA1 and the arrangement of the row of light emitting diodes LEDA2. The arrangement of the diodes of respective colors of the row of light emitting diodes LEDA1 and the arrangement of the diodes of respective colors of the row of light emitting diodes LEDA2 are set equal and the light emitting diodes are arranged in order such as, red, green, red, blue, red, . . . green or the like from the one end side respectively.

Here, as described above, the respective numbers of the light emitting diodes of respective colors are determined corresponding to the areas of the pixels which are allocated to the corresponding colors in the unit pixels for color display.

FIG. 24B is an explanatory view showing another embodiment of the arrangement of the light emitting diodes of respective colors of the row of light emitting diodes LEDA1 and of the row of light emitting diodes LEDA2 respectively.

While the light emitting diodes of respective colors are arranged in the row of light emitting diodes LEDA1 in order of such as, red, green, blue, red, . . . red, green, blue, from one end side thereof such that their numbers are set equal, the light emitting diodes of respective colors are arranged in the row of light emitting diodes LEDA2 in order of such as, for example, red, green, red, blue, . . . green such that their numbers are different.

In this case also, it is needless to say that the respective numbers of the diodes of the respective colors of the row of light emitting diodes LEDA2 are determined corresponding to the areas of the pixels which are allocated to the corresponding colors in the unit pixel for color display.

Here, it is needless to say that the light emitting diodes may be arranged such that the mode of arrangement is exchanged between the row at the light guide plate side and the row at the opposite side.

FIG. 24C is an explanatory view showing another embodiment of the arrangements of the light emitting diodes of respective colors of the row of light emitting diodes LEDA1 and the row of light emitting diodes LEDA2 respectively.

While the light emitting diodes LEDA1 are arranged in the row of light emitting diodes in order of such as, red, green, blue, red, . . . red, green, blue, from one end side thereof such that their numbers are set equal, the light emitting diodes LEDA2 of respective colors are arranged in the row of light emitting diodes such that, for example, only a plurality of red light emitting diodes are arranged.

In this constitution, in the light emitting diodes at the light-guide-plate side and the light emitting diodes at the opposite side, the number of the red light emitting diodes is largest and the numbers of the green and blue light emitting diodes are equal to each other and less than the number of the red light emitting diodes. Accordingly, the relationship of the areas of the pixels which are allocated to the corresponding color in the unit pixel for color display substantially corresponds to the number of the light emitting diodes.

Here, it is needless to say that the light emitting diodes may be arranged such that the mode of arrangement is exchanged between the light emitting diodes at the light-guide-plate side and the light emitting diodes at the other side.

FIG. 25 is an explanatory view showing another embodiment of the backlight BL of the liquid crystal display device according to the invention. As described in this drawing, the light source LG is arranged along one side surface of the light guide plate CLB and this light source LG is constituted of a light-emitting-diodes LEDA including a large number of diodes which are arranged in parallel in the longitudinal direction of one side surface and a reflection plate RF formed of a plane mirror which reflects the light from the respective light emitting diodes in the light-emitting-diode row LEDA to one side-surface-side.

Accordingly, in each light emitting diode, a light irradiation surface thereof is directed to the liquid-crystal display-panel-PNL side and the direction of the light therefrom is changed by 90 degrees by the reflection plate RF and is incident on one side surface of the light guide plate CLB.

Figure 26:
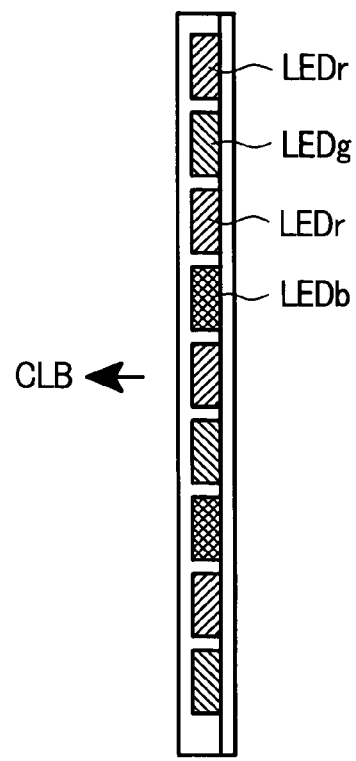
FIG. 26 is a view showing an arrangement of respective light emitting diodes in the backlight shown in FIG. 25.

FIG. 26 is a view showing one embodiment of the arrangement of the light emitting diodes of respective colors of the above-mentioned rows LEDA of the light emitting diodes and the light emitting diodes are arranged in order of red, green, red, blue, . . . green.

Here, as described above, the respective numbers of the light emitting diodes of respective colors are determined corresponding to the areas of the pixels which are allocated to the corresponding colors in the unit pixels for color display.

Figure 27:
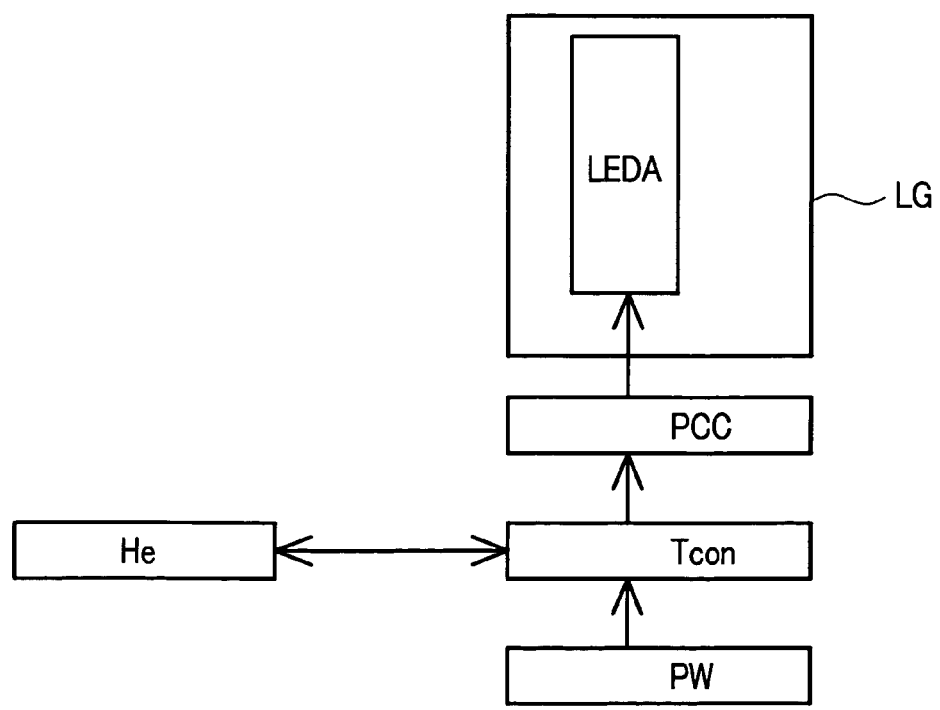
FIG. 27 is a block diagram showing one embodiment of a circuit which controls the emission of light of a light source of the backlight of the liquid crystal display device according to the invention.

FIG. 27 is a block diagram showing one embodiment of the circuit for controlling the light emission of the light source LG of the backlight BL shown in FIG. 25, FIG. 26, for example.

The constitution described in FIG. 27 has a power circuit PW and the power source from the power circuit PW is supplied to a display drive circuit Tcon. The display drive circuit Tcon performs the transmission and the reception of signals with a video signal drive circuit He. Then, from this display drive circuit Tcon, signals are also transmitted to a light source control device PCC and the respective intensities of lights emitted from the respective light emitting diodes of rows of the light emitting diodes LEDA can be controlled.

Here, the pixels of the liquid crystal display device which is provided with the circuit shown in FIG. 27, as mentioned above, differ in light transmission quantities or numerical apertures of respective pixels in the unit pixel for color display. However, as shown in a cross-sectional view shown in FIG. 28A or in a plan view shown in FIG. 28B, the liquid crystal display device may be constituted that the pixels have the same constitutions.

Figure 28A:
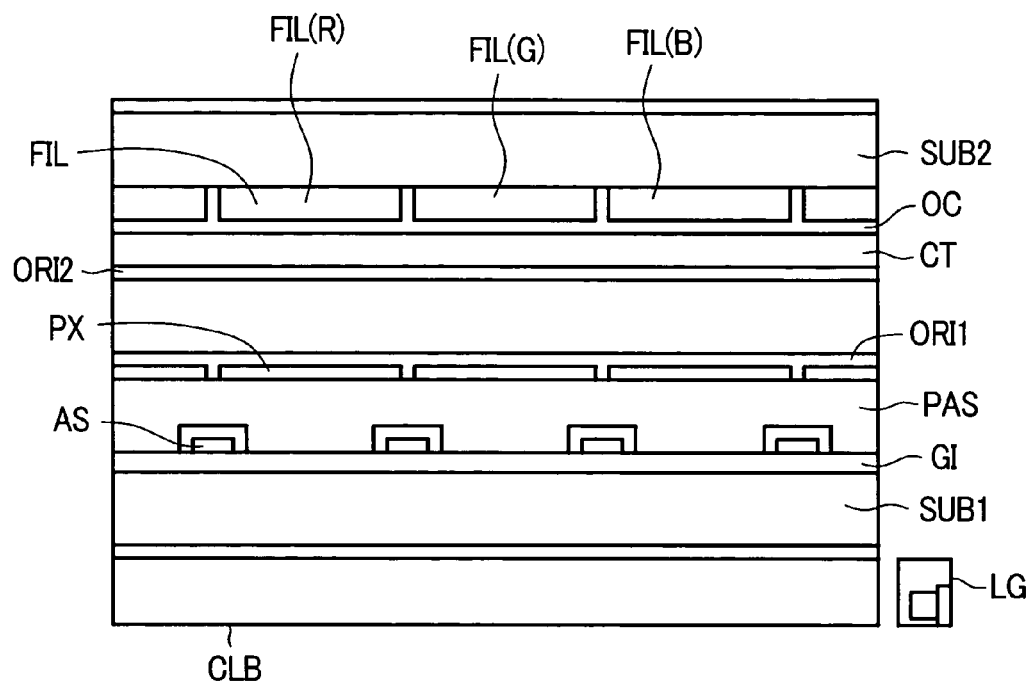
FIG. 28A and FIG. 28B are views showing another embodiment of the pixel of the liquid crystal display device according to the invention, wherein FIG. 28A corresponds FIG. 1A and FIG. 28B corresponds FIG. 1B.
Figure 28B:
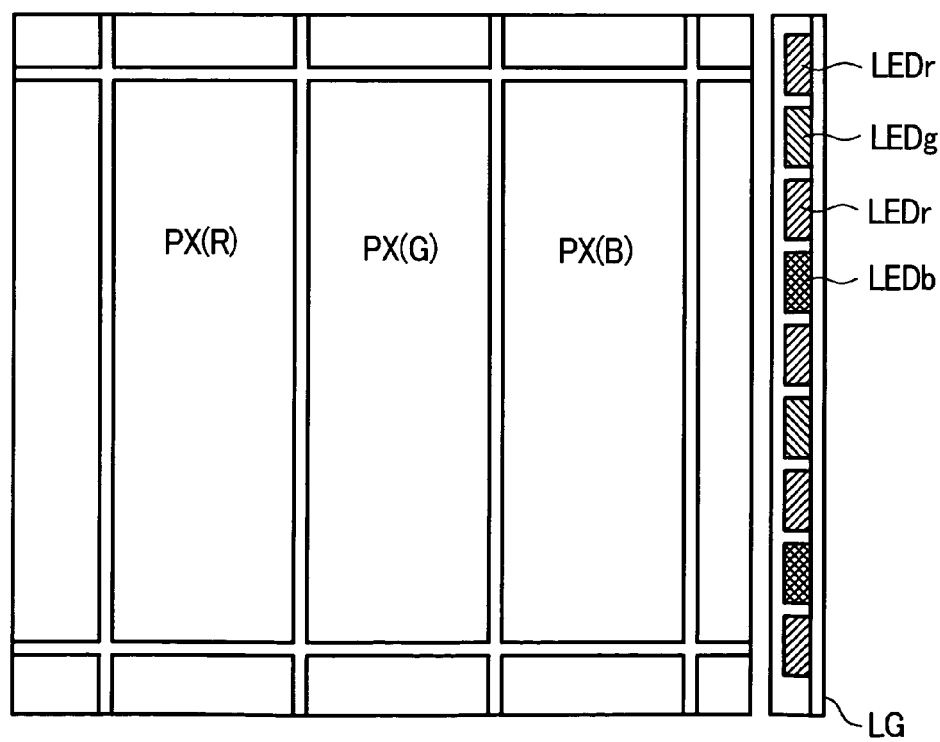

FIG. 28A corresponds to FIG. 5 and FIG. 28B corresponds to FIG. 6. The constitution which makes this embodiment different from the embodiment shown in FIG. 5, FIG. 6 lies in that area of the pixel allocated to red, the area of the pixel allocated to green and the area of the pixel allocated to blue, that is, the areas of the pixels each of which is surrounded by a pair of neighboring gate signal lines GL and by a pair of neighboring drain signal lines DL are set substantially equal and patterns of the respective members which are formed in these regions are formed in the same size at the corresponding positions.

Here, as the light source LG of the backlight BL, the respective light emitting diodes are arranged in order of, for example, red, green, red, blue, red, green, red, blue, red, . . . .

In this case, the intensities of lights emitted from the light emitting diodes of respective colors can be controlled by the above-mentioned circuit and hence, the image which can be obtained through the liquid crystal display panel can be, for example, reddish color based on a user's taste.

Figure 29:
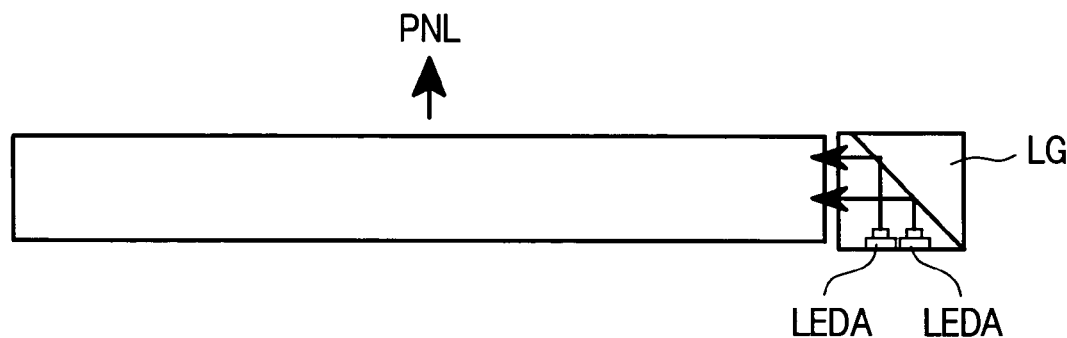
FIG. 29 is a constitutional view showing another embodiment of the backlight of the liquid crystal display device according to the invention.

FIG. 29 is an explanatory view showing another embodiment of the backlight of the liquid crystal display device according to the invention and corresponds to FIG. 25.

The constitution which makes this embodiment different from the embodiment shown in FIG. 29 lies in the rows of the light emitting diodes which are constituted of the rows of the light emitting diodes arranged in two rows along one side surface of the light guide plate each other. All light emitting diodes are configured such that the lights emitted from the light emitting diodes are incident on one side surface of the light guide plate CLB by way of the reflection plate RF.

Figure 30:
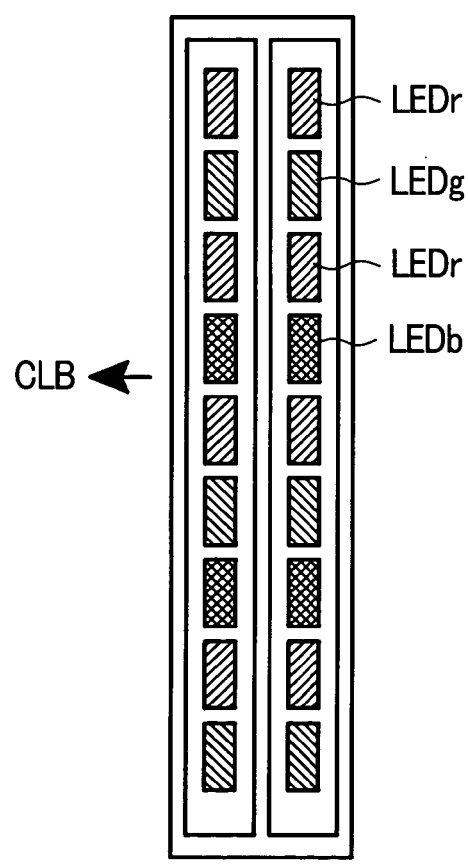
FIG. 30 is a view showing the arrangement of respective light emitting diodes in the backlight shown in FIG. 29.

FIG. 30 is a view showing one embodiment of the arrangement of the respective light emitting diodes of the respective rows of light emitting diode arranged in two rows. Either one of the row of the light emitting diodes at the side close to the light guide plate and the row of the light emitting diodes at the side remote from the light guide plate are, for example, arranged in order of red, green, red, blue . . . green from one side thereof.

In this constitution also, as described above, respective numbers of the light emitting diodes of respective colors are determined corresponding to the areas of the pixels which are allocated to the corresponding colors in the unit pixels for color display.

Figure 31:
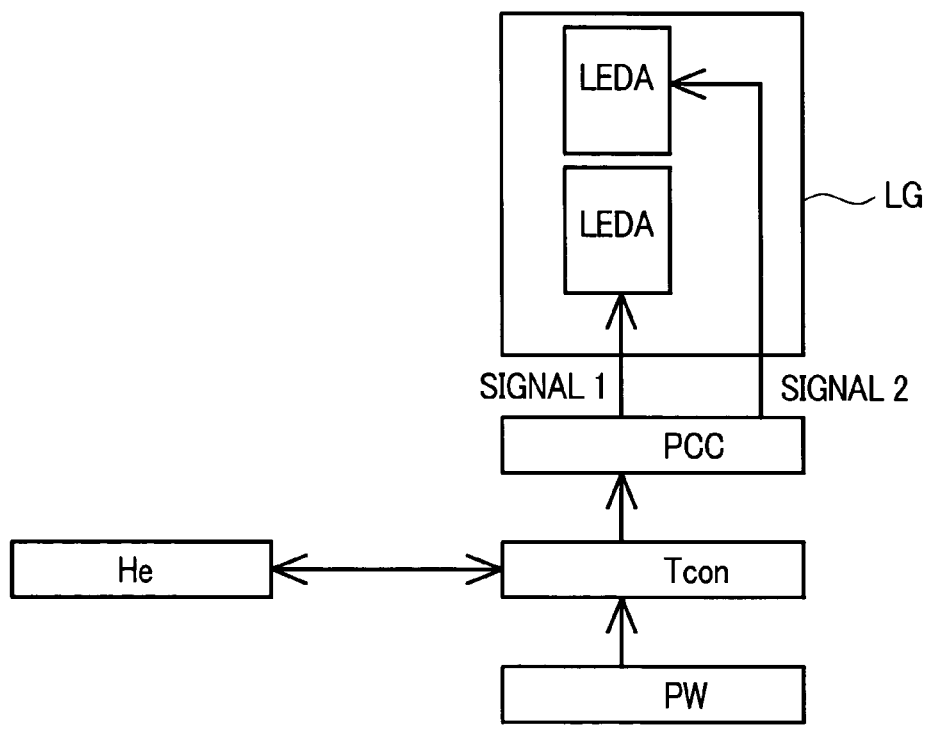
FIG. 31 is a block diagram showing another embodiment of a circuit which controls the emission of light of a light source of the backlight of the liquid crystal display device according to the invention.

FIG. 31 is a block diagram showing one embodiment of the circuit which controls the emission of light from the light source LG of the backlight BL shown in FIG. 30.

To the light source LG, a signal 1 and a signal 2 are supplied from a light emitting control circuit PCC, wherein the respective light emitting diodes of the row of the light emitting diodes LEDA on the side close to the light guide plate are made to emit light in response to the signal 1, while the respective light emitting diodes of the row of the light emitting diodes LEDA on the side remote from the light guide plate are made to emit light in response to the signal 2.

That is, the control circuit shown in this drawing is constituted such that the control circuit can control the row of the light emitting diodes LEDA at the side close to the light guide plate CLB and the row of the light emitting diodes LEDA at the side remoter from the light guide plate CLB independently and, at the same time, can control the intensities of lights emitted from the respective light emitting diodes.

Further, by constituting the control circuit such that the control circuit is connected to the backlight shown in FIG. 29, it is possible to produce the color close to white color by controlling the respective intensities of red, green, blue of the row of light emitting diodes LEDA at the side close to the light guide plate CLB and, further, the intensity of red of the row of the light guide diodes LEDA at the side remote from the light guide plate CLB according to a user's taste.

Figure 32:
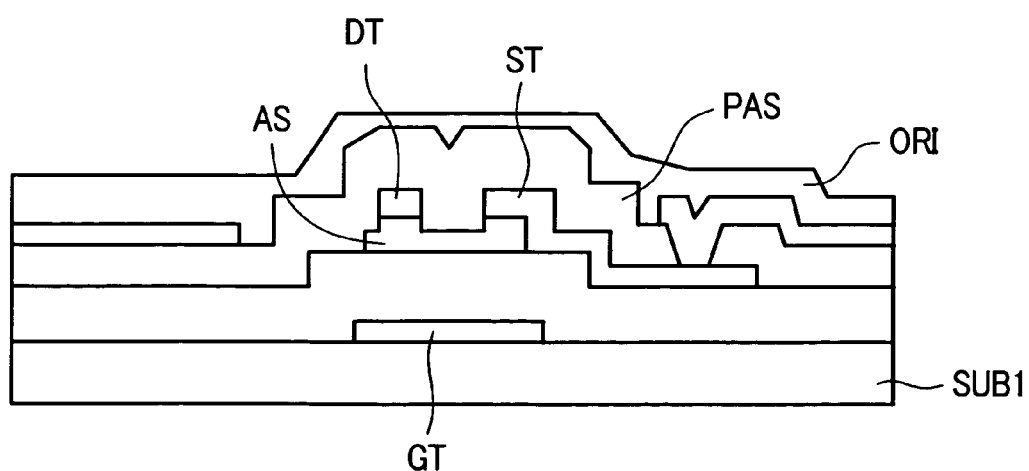
FIG. 32 is a cross-sectional view taken along a line B–B' in FIG. 1.

Here, FIG. 32 is a view showing a cross section of one embodiment of the constitution of the a portion where the thin film transistor TFT is formed in each pixel of the liquid crystal display device and is a cross-sectional view taken along a line B–B' of FIG. 1A, for example.

On the liquid crystal side of the one substrate SUB1 out of substrates which are arranged to face each other with the liquid crystal therebetween, first of all, gate electrodes GT (gate signal lines GL) are formed and an insulation film GI forming a gate insulation film over this gate signal lines GL is also formed. Above this insulation film GI, semiconductor layers AS are formed on the above-mentioned gate electrodes GT in an overlapped manner, and on the upper side of this semiconductor layers, drain electrode DT, source electrode ST are formed.

Accordingly, it is possible to provide the thin film transistor TFT having the inversely-staggered MIS structure which allows the drain electrode DT and the source electrode ST become conductive to each other when a voltage (scanning signal voltage) is applied to the gate electrode GT.

Here, the drain electrode DT is formed integrally with the drain signal line DL, for example, and the source electrode ST which is formed simultaneously with the drain electrode DT is connected to the pixel electrode PX through a contact hole which is formed in a protective film PAS which is formed over the thin film transistor TFT.

An orientation film ORI1 is formed on an upper surface of the protective film PAS over the pixel electrode PX and the orientation film ORI1 determines the initial orientation direction of molecules of the liquid crystal which is directly connected to the orientation film ORI1.

Figure 33:
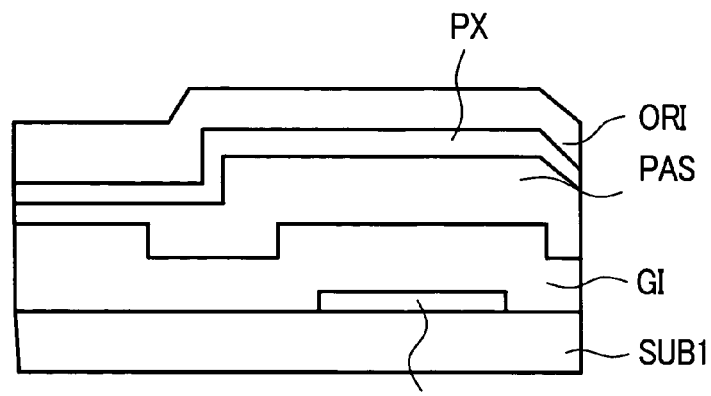
FIG. 33 is a cross-sectional view taken along a line C–C' in FIG. 1.

FIG. 33 is a view showing the cross-section of one embodiment of the constitution at the portion where the capacity element Cadd is formed in each pixel of the liquid crystal display device and is a cross-sectional view taken along a line C–C' of FIG. 1A, for example.

In the pixel, the capacity element Cadd is formed between the pixel electrode PX and the gate signal line GL which sandwiches the pixel together with the other gate signal line GL which drives the thin film transistor TFT, and the dielectric film thereof is a stacked body of the above-mentioned insulation film GI and the protective film PAS.

Figure 34:
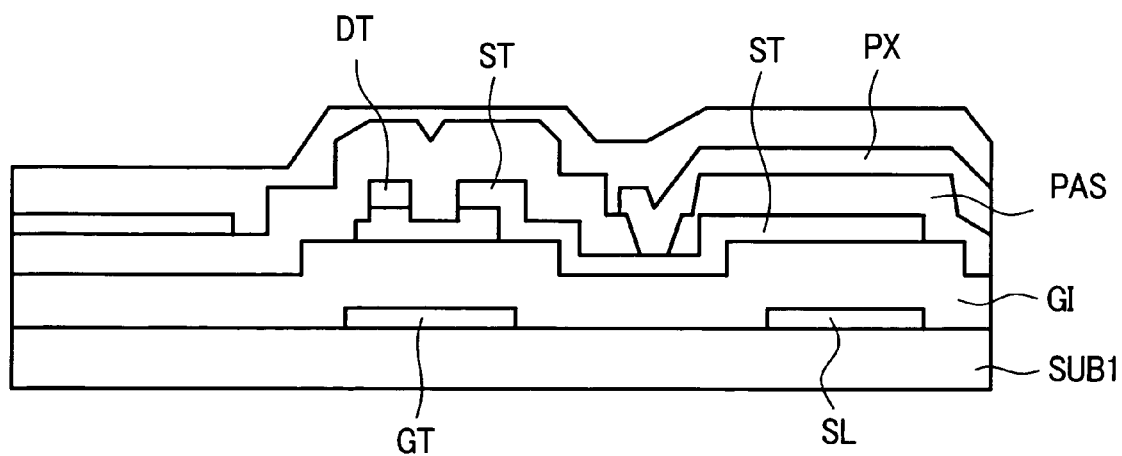
FIG. 34 is a cross-sectional view taken along a line C–C' in FIG. 15A.

FIG. 34 is a view showing a cross section of one embodiment of the constitution at a portion where a thin film transistor TFT in respective pigments in the liquid crystal display device and the capacity element Cstg arranged closed to the thin film transistor TFT is formed and is a cross-sectional view taken along a line C–C' of FIG. 15A, for example.

The capacity element Cstg is formed between the storage signal line SL which is formed on the same layer as the gate electrode GT (gate signal line GL) of the thin film transistor TFT and the source electrode ST of the thin film transistor TFT which is extended on the storage signal line SL in an overlapped manner and the dielectric film is constituted of the insulation film GI.

The above-mentioned respective embodiments may be used in a single form or in combination. It is because the advantageous effects of the respective embodiments can be obtained in a single form or synergistically.

According to the liquid crystal display device having such a constitution, basically, by changing the light transmitting qualities or the numerical apertures of the pixels of the unit pixel for color display which are allocated to respective colors, the number of light emitting elements of respective colors of the light source is determined.

Here, although the lights emitted from the respective light emitting elements which constitute the light source do not produce a white light, the lights which pass through the respective pixels reach a viewer as red, green and blue lights corresponding to the light transmitting quantity of liquid crystal.

Further, although the pixels which decrease the light transmitting quantity or the numerical aperture are present in the unit pixel for color display, the number of light emitting elements of color corresponding to such pixels is increased and hence, the intensity of light is increased thus obviating the occurrence of drawbacks from this point of view.

Accordingly, due to the above-mentioned constitution, to the contrary, when it is necessary to arbitrarily set the number of light emitting elements of respective colors used as the light source, it is sufficient to change the light transmitting quantities or the numerical apertures of the pixels allocated to respective colors and hence, the degree of freedom of the backlight or the like can be increased.

Further, by turning on and off some light emitting elements out of a large number of light emitting elements, it is possible to control the color temperature in a wide range while suppressing the influence to the whole brightness.

What is claimed is:

1. A liquid crystal display device comprising a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color.

2. A liquid crystal display device according to claim 1, wherein the light source is constituted of light emitting elements of respective colors which are arranged on a side surface of at least one side of a light guide plate arranged on a back surface of the liquid crystal display panel in parallel along the longitudinal direction of the side surface.

3. A liquid crystal display device according to claim 1, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

4. A liquid crystal display device comprising a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the largest numerical aperture out of the respective pixels allocated to red, green and blue, and the number of light emitting elements of color corresponding to color which is allocated to the pixels having the largest numerical aperture is smaller than the number of light emitting elements of other color.

5. A liquid crystal display device according to claim 4, wherein the light source is constituted of light emitting elements of respective colors which are arranged on a side surface of at least one side of a light guide plate arranged on a back surface of the liquid crystal display panel in parallel along the longitudinal direction of the side surface.

6. A liquid crystal display device according to claim 4, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

7. A liquid crystal display device comprising a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the smallest light transmitting quantity out of the respective pixels allocated to red, green and blue, and the number of light emitting elements of color corresponding to color which is allocated to the pixels having the smallest light transmitting quantity is larger than the number of light emitting elements of other color.

8. A liquid crystal display device according to claim 7, wherein the light source is constituted of light emitting elements of respective colors which are arranged on a side surface of at least one side of a light guide plate arranged on a back surface of the liquid crystal display panel in parallel along the longitudinal direction of the side surface.

9. A liquid crystal display device according to claim 7, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

10. A liquid crystal display device comprising a liquid crystal display panel having respective pixels which are allocated to red, green and blue and a light source which allows light to pass through the respective pixels, wherein the light source is constituted of a plurality of red light emitting elements, a plurality of green light emitting elements and a plurality of blue light emitting elements, the improvement being characterized in that the liquid crystal display device includes pixels which have the smallest numerical aperture out of the respective pixels allocated to red, green and blue, and the number of light emitting elements of color corresponding to color which is allocated to the pixels having the smallest numerical aperture is larger than the number of light emitting elements of other color.

11. A liquid crystal display device according to claim 10, wherein the light source is constituted of light emitting elements of respective colors which are arranged on a side surface of at least one side of a light guide plane arranged on a back surface of the liquid crystal display panel in parallel along the logitudinal direction of the side surface.

12. A liquid crystal display device according to claim 10, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

13. A liquid crystal display device comprising a liquid crystal display panel having respective pixels which are allocated to red, green and blue and a light source which allows light to pass through the respective pixels, wherein each pixel includes a thin film transistor which is driven in response to a signal from a gate signal line and a pixel electrode to which a signal from a drain signal line is supplied through the thin film transistor, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a channel width of the thin film transistors provided to the pixels having the largest light transmitting quantity out of the respective pixels allocated to red, green and blue is set larger than a channel width of the thin film transistors provided to other pixels.

14. A liquid crystal display device according to claim 13, wherein the light source is constituted of light emitting elements of respective colors which are arranged on a side surface of at least one side of a light guide plate arranged on a back surface of the liquid crystal display panel in parallel along the longitudinal direction of the side surface.

15. A liquid crystal display device according to claim 13, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

16. A liquid crystal display device comprising a liquid crystal display panel having respective pixels which are allocated to red, green and blue and a light source which allows light to pass through the respective pixels, wherein each pixel includes a thin film transistor which is driven in response to a signal from a gate signal line and a pixel electrode to which a signal from a drain signal line is supplied through the thin film transistor, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a channel width of the thin film transistors provided to the pixels having the largest light transmitting quantity out of the respective pixels allocated to red, green and blue is set larger than a channel width of the thin film transistors provided to other pixels, and a width of a drain signal line which is connected to the thin film transistors provided to the pixels having the largest light transmitting quantity out of the respective pixels allocated to red, green and blue is set wider than a width of a drain signal line which is connected to the thin film transistors provided to other pixels.

17. A liquid crystal display device according to claim 16, wherein the light source is constituted of light emitting elements of respective colors which are arranged on a side surface of at least one side of a light guide plate arranged on a back surface of the liquid crystal display panel in parallel along the longitudinal direction of the side surface.

18. A liquid crystal display device according to claim 16, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

19. A liquid crystal display device comprising a liquid crystal display panel having respective pixels which are allocated to red, green and blue and a light source which allows light to pass through the respective pixels, wherein each pixel includes a thin film transistor which is driven in response to a signal from a gate signal line and a pixel electrode to which a signal from a drain signal line is supplied through the thin film transistor, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a spaced-apart distance between the pixel electrode of the pixel having the largest light transmitting quantity out of the respective pixels allocated to red, green and blue and the gate signal line which drives the thin film transistor of the pixel is set larger than a spaced-apart distance between the pixel electrode of other pixel and the gate signal line which drives the thin film transistor of other pixel.

20. A liquid crystal display device according to claim 19, wherein the light source is constituted of light emitting elements of respective colors which are arranged on a side surface of at least one side of a light guide plate arranged on a back surface of the liquid crystal display panel in parallel along the longitudinal direction of the side surface.

21. A liquid crystal display device according to claim 19, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

22. A liquid crystal display device comprising a liquid crystal display panel having respective pixels which are allocated to red, green and blue and a light source which allows light to pass through the respective pixels, wherein each pixel includes a thin film transistor which is driven in response to a signal from a gate signal line, a pixel electrode to which a signal from a drain signal line is supplied through the thin film transistor and a capacitance element which is formed between a connection portion of the thin film transistor with the pixel electrode and a storage signal line, and the light source is constituted of a plurality of red light emitting elements, a plurality of green light emitting elements and a plurality of blue light emitting elements, the improvement being characterized in that the liquid crystal display device includes pixels which have the largest light transmitting quantity out of the respective pixels allocated to red, green and blue, and the number of light emitting elements of color corresponding to color which is allocated to the pixels having the largest light transmitting quantity is smaller than the number of light emitting elements of other color, and a capacitance value of the capacitance elements provided to the pixels having the largest light transmitting quantity out of the respective pixels allocated to red, green and blue is set smaller than a capacitance value of the capacitance elements provided to other pixels.

23. A liquid crystal display device according to claim 22, wherein the light source is constituted of light emitting elements of respective colors which are arranged on a side surface of at least one side of a light guide plate arranged on a back surface of the liquid crystal display panel in parallel along the longitudinal direction of the side surface.

24. A liquid crystal display device according to claim 22, wherein with respect to the respective pixels allocated to red, green and blue, the pixels allocated to any one color have the largest light transmitting quantity or numerical aperture, the pixels allocated to another color have the smallest light transmitting quantity or numerical aperture, and the pixels allocated to still another color have an intermediate light transmitting quantity or numerical aperture.

* * * * *